United States Patent [19]

Kubota

[11] Patent Number: 5,992,737
[45] Date of Patent: Nov. 30, 1999

[54] INFORMATION SEARCH METHOD AND APPARATUS, AND MEDIUM FOR STORING INFORMATION SEARCHING PROGRAM

[75] Inventor: Rie Kubota, Yokohama, Japan

[73] Assignee: International Business Machines Corporation, Armonk, N.Y.

[21] Appl. No.: 08/805,846

[22] Filed: Mar. 3, 1997

[30] Foreign Application Priority Data

Mar. 25, 1996 [JP] Japan .................................. 8-068655

[51] Int. Cl.⁶ ............................................... G06K 05/00
[52] U.S. Cl. ........................ 235/380; 395/611; 395/161
[58] Field of Search ............................. 235/380, 382, 235/375, 492, 486, 611; 395/161, 155, 145, 157; 707/100, 500

[56] References Cited

U.S. PATENT DOCUMENTS 5,524,201  6/1996  Shwarts et al. ..................... 395/161
5,778,223  7/1998  Velissaropoulos ................... 395/611

*Primary Examiner*—Thien Minh Le
*Attorney, Agent, or Firm*—Daniel E. McConnell

[57] ABSTRACT

A system and method for searching a large volume of data stored in a disk in, for example, document file format at a high speed while allowing desired ambiguity. The present invention provides a character string search scheme which enables a user to optionally designate the degree of ambiguity for a character string to be searched. The present invention also provides an index structure for implementing a character string search scheme which enables a user of the search scheme to optionally designate the degree of ambiguity for a character string to be searched. The present invention also provides a character string search scheme which enables the scheme to perform searches in a manner close to human feeling by ambiguity search. Details of the manner in which such enablements are implemented are found in the detailed specification.

22 Claims, 8 Drawing Sheets

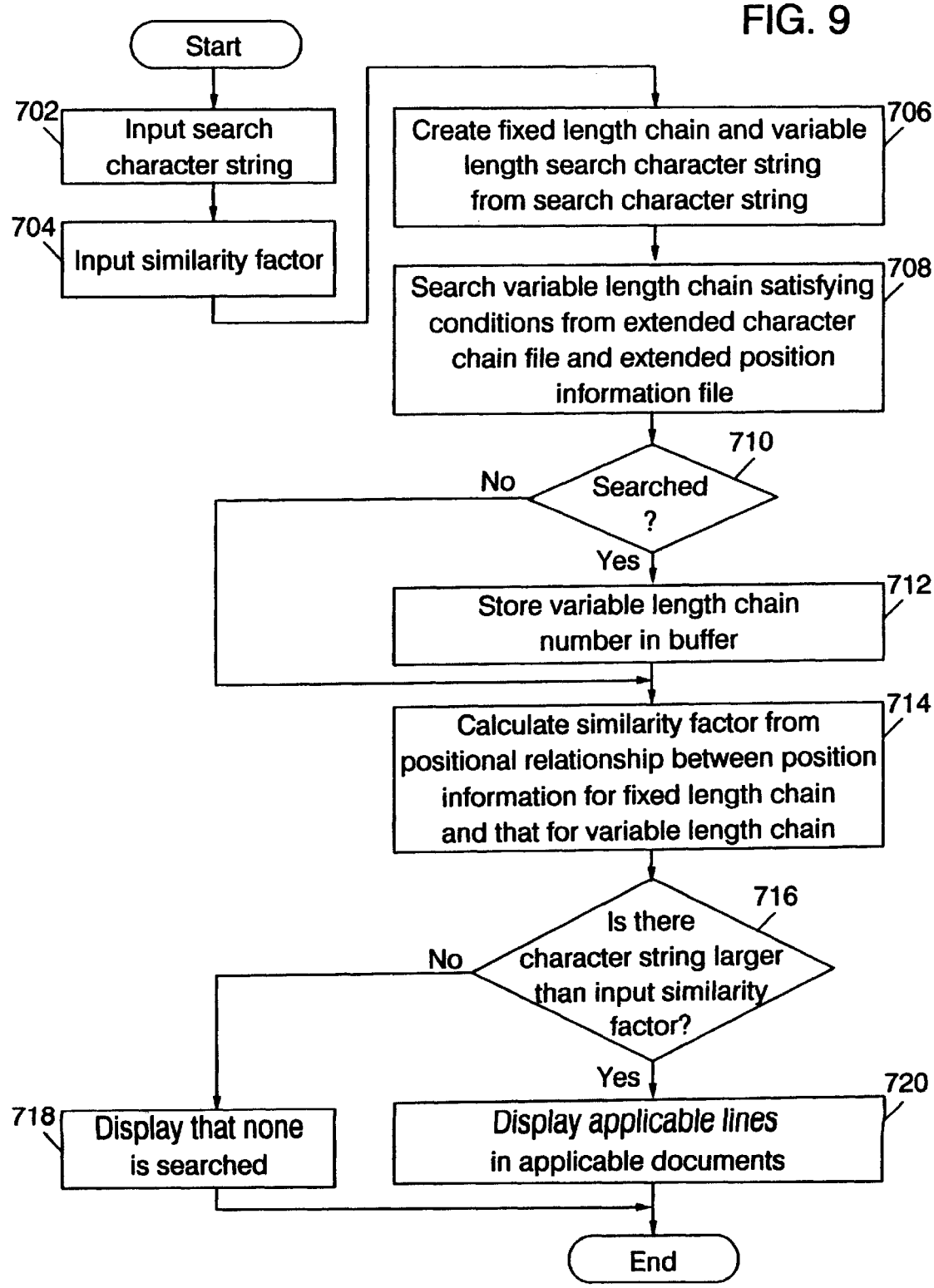

INFORMATION SEARCH METHOD AND APPARATUS, AND MEDIUM FOR STORING INFORMATION SEARCHING PROGRAM

BACKGROUND OF THE INVENTION

The present invention relates to a system and method for searching a large volume of data stored in a disk in, for example, document file format at a high speed while allowing desired ambiguity.

Conventionally, there has been demand to search a large volume of data, such as newspaper accounts, patent publications, or scientific/engineering literature, written in natural language and stored in a disk at a high speed. There have been proposed various search methods. Such methods are roughly divided as follows.

Keyword search scheme: This scheme previously indexes individual document and keywords indicating contents of the document. At the moment, methods for determining the keywords include automatic keyword extraction by the morphemic analysis, manual appending of keywords, and a combination of them. However, this scheme can only search character strings indexed as keywords. In addition, because the accuracy of automatic keyword extraction by the morphemic analysis depends on the accuracy of a dictionary, there is a disadvantage that it requires much manpower for maintaining the dictionary.

Full text search scheme without index: This is a scheme not to use an index, but to scan all documents to be searched every time a character string which is wanted to be searched is designated. Some systems use special hardware to increase the search speed. However, a system employing special hardware increases cost, and may impose restrictions on the type of machine which can be used in a client/server environment.

Full text search scheme with index: The present invention relates to a scheme for searching full document with index. Known techniques intending to increase the speed of full text search with use of index include the following.

Japanese Published Unexamined Patent Application (PUPA) No. 4-205560 discloses creating a search file by dividing a character string to be searched into search units, each of which is a unit for performing the search; appending ascending codes for every search unit; appending attribute codes to the divided search units, the attribute code indicating a logical partition for the search unit; and appending character position sequence codes to every characters in the character string to be searched, the sequence codes indicating the position of character in the search unit, whereby character position information consisting of a search unit identification code, the character position sequence code, and the attribute code is created and stored in areas by character type.

Japanese PUPA No. 4-215181 discloses creating a search file for reducing the number of collation for character strings for search processing and for enabling a general purpose information processing system to perform high speed collation, in which search file character set position information is grouped by character set type, the character set position information indicating at which position in the character string each character set constituting the character string to be searched is positioned.

There frequently arises a necessity to search not only document containing character strings fully matching a search character string, but also document containing character strings partially matching it. For example, there is a case where the user is uncertain of the search character string, or where the search character string may appear in variations so that it is difficult to enumerate all such variations. A typical method for designating a partial character string in the prior art is to use regular expression. According to such method, it is possible to designate repetition of any character zero or more times, repetition of any character one or more times, the end of a line, the top of a line, or any character within a range of specific character codes.

In addition, Japanese PUPA No. 63-99830 discloses a system having a function for partial matching between search character string data and character string data to be searched, the system comprising a table which accumulates data on synonym relationship in the search character string data, and data indicating whether the search character string data appears in any character string data to be searched.

Furthermore, Japanese PUPA No. 62-221027 discloses, when a character string taken out from the top of a character string for partial search is not retrieved from a dictionary, reducing the number of invalid searches by performing forward search for a next taken-out character string the length of which is incremented by one, whereby a word can be taken out at a relatively high speed and efficiently.

Furthermore, Japanese PUPA Nos. 4-326164 and 5-174067 disclose a database search system comprising search means which stores self-correlation information for every articles to be searched, finds the degree of matching between the self-correlation information of search keys and the self-correlation information of the articles to be searched, and outputs the number of articles in the descending order of the degree of matching.

However, these character string search techniques of the prior art have difficulty in designating the degree of ambiguity of character strings to be searched or the like so that the result of a search may be not desirable for the user, or contain many unnatural character strings. In addition, in these character string search techniques of the prior art, when a character string to be searched is "This is a pencil", it is impossible to determine character strings such as not only "This is a pemcil" (one wrong character) and "This is a red pencil" (one interposed word) but also "This is a red pemcil" (one wrong character and one interposed word) as a character string similar to the search character string.

SUMMARY OF THE INVENTION

A purpose of the present invention is to provide a character string search scheme which enables a user to optionally designate the degree of ambiguity for a character string to be searched.

Another purpose of the present invention is to provide an index structure for implementing a character string search scheme which enables it to optionally designate the degree of ambiguity for a character string to be searched.

Still another purpose of the present invention is to provide a character string search scheme which enables the scheme to perform searches in a manner close to human feeling by ambiguity search.

BRIEF DESCRIPTION OF THE DRAWINGS

Some of the purposes of the invention having been stated, others will appear as the description proceeds, when taken in connection with the accompanying drawings, in which:

FIG. 9 is a flowchart showing an ambiguity search process using an index file.

DESCRIPTION OF THE PREFERRED EMBODIMENT(S)

Figure 1:
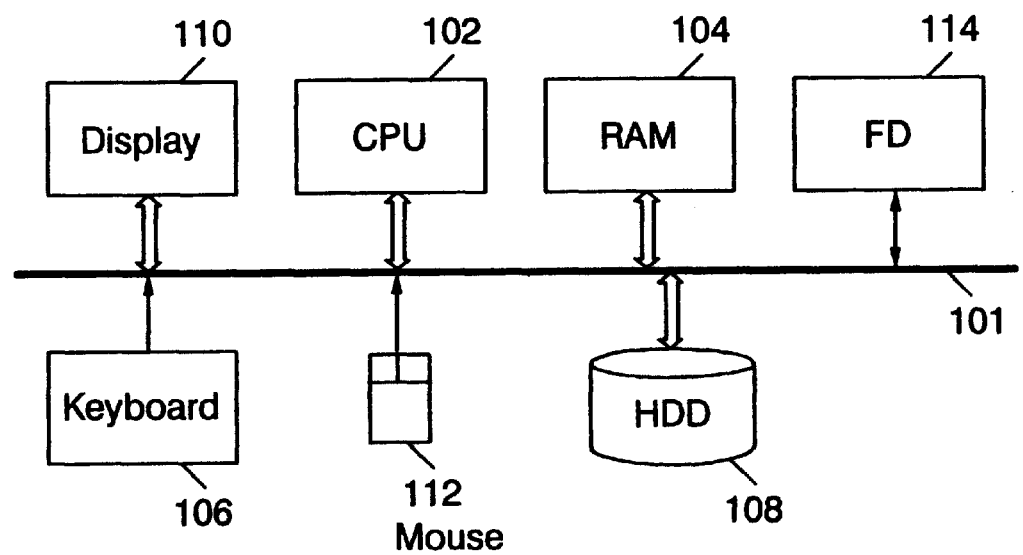
FIG. 1 is a block diagram showing a hardware configuration.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

A preferred embodiment of the present invention enables it to search any consecutive N characters in a document, or any consecutive N' characters in a word (word in English or the like) at a high speed so that it is possible to search by using the index file at a high speed how many consecutive characters match between a character string to be searched and the document, and how many characters are interposed in them.

A preferred embodiment of the present invention can attain high speed search for a document written in both a language which has many kinds of characters, but does not have explicit word delimiter in representation such as Japanese and Chinese (non-delimiter language), and a language which has relatively small kinds of characters, and is expressed with explicit word delimiters such as English (delimiter language).

According to the present invention, to perform full text search for a database consisting of a plurality of documents, unique numbers (symbols) are appended to individual document, an index file being arranged to store a sequence of characters belonging to suitably determined character set C (hereinafter called a "variable length chain") in each document, individual consecutive N characters not belonging to the character set C (hereinafter called a "fixed length chain"), and the number of document in which both of them appear and position information in the document. In addition, the variable length chain is appended with a unique number. The index file is arranged to store individual N' characters of the variable length chain (hereinafter called an "extended fixed length chain"), and the number of variable length chain in which these N' characters appear and the position information in the variable length chain. Preferably, the index file comprises four files, a character chain file, a position information file, an extended character chain file, and an extended position information file. The character chain file stores the variable length chain, the fixed length chain, a delimiter pattern, and where in the position information file the document number corresponding to them and the position number in document are positioned. The position information file stores the document number and the position number in document. The extended character chain file stores the extended character chain, and where in the extended portion information file the variable length chain number corresponding to it and the position number in the variable length chain are positioned. The extended position information file stores the variable length chain number and the position number in the variable length chain.

The present invention proposes a scheme for searching at a high speed a document containing a character string which has an arrangement of characters similar to a designated character string by using such an index file. This scheme makes it possible to designate a character string to be searched and search accuracy (larger than zero, but one or less) so that a document containing a "similar character string" with a "similarity factor" to the character string to be searched equal to or larger than the designated search accuracy and the position in the document of the "similar character string" can be identified. This processing proceeds by selecting a character string to be searched and a "similar character string" from a document, and digitizing a "similarity factor" from two viewpoints of how many characters are consecutively matched, and how many extra characters are interposed in it.

In this case, if the "similarity factor" is at its maximum value of 1, it means that the character strings are fully matched. Or, if the character strings are fully matched, the "similarity factor" is always at 1. If one or more extra characters which do not exist in a character string to be searched are interposed in a similar character string, or only a part of the character string to be searched appears in the similar character string, the "similarity factor" is a value smaller than 1. However, according to the present invention, such "similarity factor" becomes a reasonable value considerably matching to normal human feeling.

According to one aspect of the present invention, there is provided a method for searching a document character string which contains a variable length chain document character string, and which is similar to a search character string at a predetermined similarity factor, said search character string containing a variable length chain search character string, in a document searchably stored through computer processing, the method comprising the steps of associating document character string identifying information for identifying a document character string in which said variable length chain document character string exists and document character string position information for indicating the position in the document character string at which the variable length chain document character string exists with the variable length chain document character string; extracting and storing a partial document character string of a length of M characters (M being a predetermined integer of one or more) from the variable length chain document character string; associating variable length chain document character string identifying information for identifying a variable length chain document character string in which the partial document character string exists and variable length chain document character string position information for indicating the position in the variable length chain document character string at which the partial document character string exists with the partial document character string; searching a partial document character string which matches a partial search character string of a length of N characters (N being a predetermined integer of one or more) extracted from the variable length chain search character string; searching a partial document character string which matches a partial search character string of a length of N characters in the variable length chain search character string but having a start position shifted by one; Identifying a set of partial document character strings matching the partial search character string in the variable length chain search character string by repeating the step of searching the partial document character strings; identifying candidates of variable length chain document character strings which have possibility of matching the variable length chain search character string at the predetermined matching factor or higher of variable length chain from variable length chain document character string identifying information and variable length chain document character string position information for a partial character string belonging to the set of partial document character strings; calculating a matching factor of variable length chain between the variable length chain search character string and the variable length chain document character string candidates; selecting a variable length chain document character string with a matching factor of variable length chain equal to or higher than a predetermined matching factor of variable length chain with the variable length chain search character string from the variable length chain document character string candidates; identifying a document character string in which the selected variable length chain document character string exists from the document character string identifying information for the selected variable length chain document character string; calculating a character string similarity factor between the document character string in which the selected variable length chain document character string exists and the search character string containing the variable length chain search character string; and, when the calculated character string similarity factor is equal to or higher than the predetermined similarity factor of character string, displaying the identified variable length chain document character string.

The terms "in a document" in discussion of the present invention includes not only "in a single document" but also "in a plurality of documents" including a database or the like. In addition, the phrases "variable length chain document character string" and the "variable length search character string" mean a variable length chain in a document and search characters, respectively, and preferably correspond to one word of the a delimiter language as defined above. However, it is not necessarily a word of the delimiter language, but may be arranged by the non-delimiter language. Such arrangement may be applied to search of a set of variable length character strings such as keywords in the abstract of a patent specification. In addition, the terms "equal to or higher than the certain similarity factor" means a similarity factor exceeding zero, but also includes the similarity factor of one, that is, the similarity factor for complete matching.

The association of the document character string identifying information and the document character string position information with the variable length chain document character string, and the association of the variable length chain document character string identifying information and the variable length chain document character string position information with the partial document character string need not to be maintained as separate files as described in the preferred embodiment of the present invention. It is sufficient that there is a link pointing to the document character string identifying information and the document character string position information to which the variable length chain document character string corresponds. Similarly, it is sufficient that there is a link allowing the scheme to point to the variable length chain document character string identifying information and the variable length chain document character string position information to which the partial document character string corresponds.

In discussion of the present invention, the phrase "search character string containing the variable length chain search character string" means not only a search character string containing another variable length chain search character string and a search character string containing a fixed length chain search character string, but also a search character string which is the variable length chain search character string itself. The search character string is preferably entered by a user through a keyboard, but may be entered from a client or another system through a network. When the present invention is applied to spelling check for an English word, the search string is automatically entered from the system by extracting words not existing in a dictionary. The "partial document character string" and the "partial search character string" mean the extended fixed length chain in the embodiment. Their length of M or N is set by the design so that it may or may not be freely set by the user. In addition, it can be arranged that the length is changed by the system according to an entered similarity factor, a sample with an average length in the variable length chain document character string in the document, or the length of a variable length chain search character string. In addition, in extracting the "partial document character string" and the "partial search character string," it may be possible to add a symbol such as "$" indicating the beginning of a variable length chain, and a code such as "¥" indicating the end of the variable length chain. The "certain similarity factor" means a similarity factor entered by the user or one determined as a default, and may be arranged to be entered by the client or another system.

According to another aspect of the present invention, there is provided a method for searching a document character string which contains a variable length chain document character string, and which is similar to a search character string at a predetermined similarity factor or higher, said search character string containing a variable length chain search character string, in a document searchably stored through computer processing, the method comprising the steps of associating the variable length chain document character string with document character string identifying information for identifying a document character string in which the variable length chain document character string exists; associating, from the variable length chain document character string, a partial document character string of a length of M characters (M being a predetermined integer of one or more) with variable length chain document character string identifying information for identifying a variable length chain document character string in which the partial document character string exists; searching a partial document character string which matches a partial search character string of a length of N characters (N being a predetermined integer of one or more) extracted from the variable length chain search character string; identifying from variable length chain document character string identifying information for a partial document character string which matches the partial search character string a variable length chain document character string relating to the partial document character string which matches the partial search character string; and identifying from document character string identifying information for the identified variable length chain document character string a document character string in which the identified variable length chain document character string exists.

In discussing the present invention, the phrase "document character string identifying information" means the document number in the embodiment, but is sufficient to be information such as address information or a document name identifying a document character string in which the variable length chain document character string exists, and not limited to the document number. In addition, the variable length chain document character string identifying information correspondes to the variable length chain number in the embodiment, but is sufficient to be information such as address information or a word name identifying a variable length chain document character string in which the partial document character string exists.

According to another aspect of the present invention, there is provided a method for searching a document character string which contains a variable length chain document character string, and which is similar to a search character string at a predetermined similarity factor or higher, said search character string containing a variable length chain search character string, in a document searchably stored through computer processing, the method comprising the steps of searching a partial document character string matching a partial search character string of a length of N characters (N being a predetermined integer of one or more) extracted from the variable length chain search character string in an index file in which the variable length chain document character string is associated with document character string identifying information for identifying a document character string in which the variable length chain document character string exists, and associated with variable length chain document character string identifying information which identifies a partial document character string of a length M characters (M being a predetermined integer of one or more) and a variable length chain document character string in which the partial document character string exists from the variable length chain document character string; identifying, from variable length chain document character string identifying information for the partial document character string matching the partial search character string, a variable length chain document character string relating to the partial document character string matching the partial search character string; and identifying, from the document character string identifying information for the identified variable length chain document character string, a document character string in which the identified variable length chain document character string exists. The "index file" has been created prior to implementation of the method of the present invention, and is stored in various media in the computer system such as RAM or the hard disk, or in various media external to the computer system such as a floppy disk or a CD-ROM.

According to another aspect of the present invention, there is provided a method for searching a document character string which contains a variable length chain document character string, and which is similar to a search character string at a predetermined similarity factor or higher, said search character string containing a variable length chain search character string, in a document searchably stored through computer processing, the method comprising the steps of associating document character string identifying information for identifying a document character string in which the variable length chain document character string exists and document character string position information for indicating the position in the document character string at which the variable length chain document character string exists with the variable length chain document character string; extracting and storing a partial document character string of a length of M characters (M being a predetermined integer of one or more) from the variable length chain document character string; associating variable length chain document character string identifying information for identifying a variable length chain document character string in which the partial document character string exists and variable length chain document character string position information for indicating the position in the variable length chain document character string at which the partial document character string exists with the partial document character string; searching a partial document character string which matches a partial search character string of a length of N characters (N being a predetermined integer of one or more) extracted from the variable length chain search character string; searching a partial document character string which matches a partial search character string of a length of N characters in the variable length chain search character string but having a start position shifted by one; identifying a set of partial document character strings matching the partial search character string in the variable length chain search character string by repeating the step of searching the matched partial document character strings; identifying, from the document character string identifying information for said identified variable length chain character string, variable length chain document character strings which are similar to the variable length chain search character string from variable length chain document character string identifying information and variable length chain document character string position information for a partial character string belonging to the set of partial document character strings; and identifying a document character string in which the identified variable length chain document character string exists.

According to another aspect of the present invention, there is provided a method for creating a file for search by the computer from a document containing a plurality of variable length chains in a storage device accessible by a computer, the method comprising the steps of extracting a first variable length chain from the document; storing information for the position in the document at which the first variable length chain appears; extracting a first extended fixed length chain from the first variable length chain; and storing information for identifying the first variable length chain in which the first extended fixed length chain exists and information for the position in the first variable length chain at which the first extended fixed length chain exists.

In discussing of the present invention, the "information for the position in the document at which the first variable length chain appears", "information for identifying the first variable length chain in which the first extended fixed length chain exists", and "information for the position in the first variable length chain at which the first extended fixed length chain exists" may be stored in separate storage devices as long as they can be accessed by the computer.

According to another aspect of the present invention, there is provided a method for creating a file for search by the computer from a document containing a plurality of variable length chains in a storage device accessible by a computer, the method comprising the steps of extracting a plurality of variable length chains from the document and storing them in a character chain file; storing in a position information file information for the positions in the document at which the plurality of variable length chains appear; extracting extended fixed length chains of a length of M characters (M being a predetermined integer of one or more) from each of the plurality of variable length chains and storing them in an extended character chain file; and storing in an extended position information file information for identifying the variable length chains in which the extended fixed length chains exist and information for the position in the variable length chains in which the extended fixed length chains exist.

According to another aspect of the present invention, there is provided a method for calculating with a computer the similarity factor between a first character string containing a first variable length chain and a second character string containing a second variable length chain, the method comprising the steps of searching the first variable length chain character string for a partial character string of a length of N characters (N being a predetermined integer of one or more) which matches in the second variable length chain; searching a partial character string of a length of N characters which is a partial character string in the first variable length chain with the start position shifted by one for a partial character string which matches in the second variable length chain; deriving variable length chain matching character identifying information for identifying characters matching the first variable length chain in the second variable length chain by repeating the step of searching the matched partial character string in the second variable length chain; calculating a variable length chain matching factor between the first variable length chain and the second variable length chain based on the variable length chain matching character identifying information and the number of characters in the first variable length chain; and calculating the similarity factor of the first character string based on the variable length chain matching factor. The variable length chain matched character identifying information is information for identifying matched and non-matched characters in the first or second variable length chain, and, particularly, the number of characters in valid matched character strings in the first or second variable length chain, but the matching factor may be calculated with information for identifying non-matched characters instead of the matched characters. In addition, it may be possible to weight or impose a penalty on the matching factor calculation depending on the nature of matched and non-matched characters instead of simply using the number of matched or non-matched characters.

According to another aspect of the present invention, there is provided a method for calculating with a computer the similarity factor between a first character string containing a first variable length chain and a second character string containing a second variable length chain, the method comprising the steps of associating character string identifying information for identifying the second character string in which the second variable length chain character string exists and character string position information for indicating the position in the second character string at which the second variable length chain character string exists with the second variable length chain character string; extracting and storing a second partial character string of a length of M characters (M being a predetermined integer of one or more) from the second variable length chain character string; associating variable length chain character string identifying information for identifying the second variable length chain character string in which the second partial character string exists and variable length chain character string position information for indicating the position in the second variable length chain character string at which the second partial character string exists with the second partial document character string; searching a second partial document character string which matches the first partial character string of a length of N characters (N being a predetermined integer of one or more) extracted from the first variable length chain character string; searching a second partial character string matching the first partial search character string of a length of N characters which is a first partial character string in the first variable length chain character string with the start position shifted by one; identifying a set of the second partial character strings matching the first partial character string in the first variable length chain character string by repeating the step of searching the second partial character string matching the first partial search character string; identifying candidates of variable length chain character strings which have possibility of matching the first variable length chain character string at the predetermined matching factor or higher of variable length chain from variable length chain character string identifying information and variable length chain character string position information for a second partial character string belonging to the set of second partial character strings; calculating a matching factor of variable length chain between the first variable length chain character string and the variable length chain character string candidates; selecting a second variable length chain character string with a matching factor of variable length chain equal to or higher than a predetermined matching factor of variable length chain with the first variable length chain character string from the variable length chain character string candidates; storing the matching factor of variable length chain for the selected second variable length chain character string; identifying from character string identifying information for the selected second variable length chain character string a second document character string in which the selected second variable length chain character string exists; and calculating the character string similarity factor between the second character string in which the selected second variable length chain character string exists and the search character string containing the first variable length chain search character string based on the stored variable length chain matching factor.

According to another aspect of the present invention, there is provided a method for searching a position where a character string similar to a search character string with a predetermined similarity factor or higher appears, the search character string containing a variable length chain search character string, the method comprising the steps of locating the start and end positions of match in the variable length chain document character string for a partial character string of a length of M characters (M being a predetermined integer of one or more) from the top of the variable length chain search character string (hereinafter the partial character string of a length of M character determined by the start and end positions being referred to a "valid matched character string"); locating the (i+i)-th valid matched character string satisfying the following conditions:

$$e(D,i)+1 < s(D,i+1) < e(D,i)+L+1,$$

and $$s(C,i+1) > e(C,i)-(M-1)$$

where
  s(D,i) is the start position of the i-th valid matched character string in the document;
  e(D,i) is the end position of the i-th valid matched character string in the document;
  s(C,i) is the start position of the i-th valid matched character string in a character string to be searched;
  e(C,i) is the end position of the i-th valid matched character string in a character string to be searched; and
  L is a predetermined integer of one or more; continuing the step of locating the (i+i)-th valid matched character string as long as valid matched character strings can be located; calculating a similarity factor between the variable length chain search character string and a character string which exists between the start position of the first valid matched character string in the variable length chain document character string and the end position of the last valid matched character string in the variable length chain document character string based on information on existence of valid matched character strings in a character string at least between the start position of the first valid matched character string in the variable length chain document character string and the end position of the last valid matched character string in the variable length chain document character string; identifying a variable length document character string in response to the fact that the calculated similarity factor is equal to or higher than a predetermined similarity factor; and identifying a document character string containing the identified variable length chain document character string.

According to another aspect of the present invention, there is provided an apparatus for searching a document character string which contains a variable length chain document character string, and which is similar to a search character string at a predetermined similarity factor or higher of character string, said search character string containing a variable length chain search character string, in a document searchably stored through computer processing, the apparatus comprising an input device for inputting the search character string; a storage device for storing a character chain file for storing the variable length chain document character string, a position information file for storing document character sting identifying information for identifying a document character string in which the variable length chain document character string exists and document character string position information for indicating the position in the document character string at which the variable length chain document character string exists, an extended character chain file for storing a partial document character string of a length of M character (M being a predetermined integer of one or more) extracted from the variable length chain document character string, and variable length chain document character string identifying information for identifying a variable length chain document character string in which the partial document character string exists, and an extended position information file for storing variable length chain document character string position information indicating the position in the variable length chain document character string at which the partial document character string exists; control means for performing search of a partial document character string matching a partial search character string of a length of N characters (N being a predetermined integer of one or more) extracted from the variable length chain search character string, search of a partial document character string matching a partial search character string of a length of N characters in the variable length chain search character string but having a start position shifted by one, identification of a set of partial document character strings matching the partial search character string in the variable length chain search character string by repeating the search of partial document character string matching the partial search character string, identification of candidates of variable length chain document character strings which have possibility of matching the variable length chain search character string at the predetermined matching factor or higher of variable length chain from variable length chain document character string iden- tifying information and variable length chain document character string position information for a partial character string belonging to the set of partial document character strings, calculation of a variable length chain matching factor between the variable length chain search character string and the variable length chain document character string candidates, selection of variable length chain document character strings having a variable length chain matching factor equal to or higher than a predetermined variable length chain matching factor with the variable length chain search character string from the variable length chain document character string candidates, identification of a document character string in which the selected variable length chain document character string exists from the document character string identifying information for the selected variable length chain document character strings, and calculation of a character string similarity factor between a document character string in which the selected variable length chain document character string exists and the search character string containing the variable length chain search character string; and a display device for displaying the identified variable length chain document character string when the calculated character string similarity factor is equal to or higher than the predetermined similarity factor.

In discussing the present invention, the "input device" is preferably a keyboard which allows a user to input characters, but the concept includes a pointing device such as a mouse and a track ball, and a touch panel for pointing a character displayed on the display device. In addition, where a search character string is input from another system, that other system is constituted as the input device. The "storage device" can be preferably implemented by using RAM, but may include various storage devices such as a hard disk drive or cache memory. The "control means" is preferably constituted by a central processing unit (CPU) having a bus, an arithmetic function and an input/output control function, a main memory for loading a program and providing a work area for the CPU, an operating system for controlling the central processing unit, and a combination of programs such as a search engine. The "display device" is preferably constituted by a display device, but includes a printing device such as a printer and a plotter for displaying a character or the like through printing.

According to another aspect of the present invention, there is provided an apparatus for searching a document character string which contains a variable length chain document character string, and which is similar to a search character string at a predetermined factor or higher, said search character string containing a variable length chain search character string, in a document searchably stored through computer processing, the apparatus comprising means for associating the variable length chain document character string with document character string identifying information for identifying a document character string in which the variable length chain document character string exists; means for associating a partial document character string of a length of M characters (M being a predetermined integer of one or more) from the variable length chain document character string with variable length chain document character string identifying information for identifying a variable length chain document character string in which the partial document character string exists; means for searching a partial document character string matching a partial search character string of a length of N characters (N being a predetermined integer of one or more) extracted from the variable length chain search character string; means for identifying a variable length chain document character string relating to the partial document character string matching the partial search character string from the variable length chain document character string identifying information for the partial document character string matching the partial search character string; and means for identifying a document character string in which the identified variable length chain document character string exists from document character string identifying information for the identified variable length chain document character string.

According to another aspect of the present invention, there is provided an apparatus for searching a document character string which contains a variable length chain document character string, and which is similar to a search character string at a predetermined similarity factor or higher, said search character string containing a variable length chain search character string, in a document searchably stored through computer processing, the apparatus comprising means for searching a partial document character string matching a partial search character string of a length of N characters (N being a predetermined integer of one or more) extracted from the variable length chain search character string in an index file, in which index file said variable length chain document character string is associated with document character string identifying information for identifying a document character string in which the variable length chain document character string exists, and associated with variable length chain document character string identifying information for identifying a partial document character string of a length of M characters (M being a predetermined integer of one or more) and a variable length chain document character string in which the partial document character string exists from said variable length chain document character string; means for identifying a variable length chain document character string relating to the partial document character string matching the partial search character string from the variable length chain document character string identifying information for the partial document character string matching the partial search character string; and means for identifying a document character string in which the identified variable length chain document character string exists from document character string identifying information for the identified variable length chain document character string.

According to another aspect of the present invention, there is provided an apparatus for searching a document character string which contains a variable length chain document character string, and which is similar to a search character string at a predetermined similarity factor or higher, said search character string containing a variable length chain search character string, in a document searchably stored through computer processing, the apparatus comprising means for associating document character string identifying information for identifying a document character string in which the variable length chain document character string exists and document character string position information indicating the position in the document character string at which the variable length chain document character string exists with the variable length chain document character string; means for extracting and storing a partial document character string of a length of M characters (M being a predetermined integer of one or more) from the variable length chain document character string; means for associating variable length chain document character string identifying information for identifying a variable length chain document character string in which the partial document character string exists and variable length chain document character string position information for indicating the position in the variable length chain document character string at which the partial document character string exists with the partial document character string; means for searching a partial document character string matching a partial search character string of a length of N characters (N being a predetermined integer of one or more) extracted from the variable length chain search character string; means for searching a partial document character string matching a partial search character string of a length of N characters in the variable length chain search character string but having a start position shifted by one; means for identifying a set of partial document character strings matching the partial search character string in the variable length chain search character string by repeating the search of partial document character string; means for identifying a variable length chain document character string similar to the variable length chain search character string from variable length chain document character string identifying information and variable length chain document character string position information for a partial character string belonging to the set of partial document character strings; and means for identifying a document character string in which the identified variable length chain document character string exists from the document character string identifying information for the identified variable length chain document character string.

According to another aspect of the present invention, there is provided an apparatus for creating a file for search by a computer from a document containing a plurality of variable length chains in a storage device accessible by a computer, the apparatus comprising means for extracting a first variable length chain from the document; means for storing position information for the position in the document at which the first variable length chain appears; means for extracting a first extended fixed length chain from the first variable length chain; and means for storing information for identifying the first variable length chain in which the first extended fixed length chain exists and position information for the position in the first variable length chain at which the first extended fixed length chain exists.

According to another aspect of the present invention, there is provided an apparatus for creating a file for search by a computer from a document containing a plurality of variable length chains in a storage device accessible by a computer, the apparatus comprising means for extracting a plurality of variable length chains from the document and storing them in a character chain file; means for storing position information for the positions in the document at which the plurality of variable length chains appear in a position information file; means for extracting an extended fixed length chain of a length of M characters (M being a predetermined integer of one or more) from each of the plurality of variable length chains, and storing it in an extended character chain file; means for storing information for identifying a variable length chain in which the extended fixed length chain exists and position information for the position in the variable length chain at which said extended fixed length chain exists in an extended position information file.

According to another aspect of the present invention, there is provided an apparatus for calculating with a computer a similarity factor between a first character string containing a first variable length chain and a second character string containing a second variable length chain, the apparatus comprising means for searching a partial character string from the first variable length chain character string, the partial character string matching in the second variable length chain for a partial character string of a length of N characters (N being a predetermined integer of one or more); means for searching a partial character string matching in the second variable length chain for a partial character string of a length of N characters the start position of which is that of a partial character string in the first variable length chain shifted by one; means for deriving variable length chain matched character identifying information for identifying characters matching the first variable length chain in the second variable length chain by repeating the means for searching the matched partial character string; means for calculating a variable length chain matching factor between the first and the second variable length chains based on the variable length chain matched character identifying information and the number of characters in the first variable length chain; and means for calculating a similarity factor of the first character string based on the variable length chain matching factor.

According to another aspect of the present invention, there is provided an apparatus for calculating with a computer a similarity factor between a first character string containing a first variable length chain and a second character string containing a second variable length chain, the apparatus comprising a storage device for storing a character chain file managing the content of the second variable length chain character string, a position information file managing character string identifying information identifying the second character string in which the second variable length chain character string exists and character string position information indicating the position in the second character string at which the second variable length chain character string exists, an extended character chain file managing a second partial character string of a length of M characters (M being a predetermined integer of one or more) extracted from the second variable length chain character string, and variable length chain character string identifying information identifying a second variable length chain character string in which the second partial character string exists, and an extended position information file managing variable length chain character string position information indicating the position in the second variable length chain character string at which the second partial character string exists; means for searching a second partial character string matching a first partial character string of a length of N characters (N being a predetermined integer of one or more) extracted from the first variable length chain character string; means for searching a second partial character string matching a first partial search character string of a length of N characters which is a first partial character string in the first variable length chain character string but having a start position shifted by one; means for identifying a set of second partial character strings matching the first partial character string in the first variable length chain character string by repeating the means for searching the second partial search character string; matching the first partial search character string; means for identifying candidates of variable length chain character strings which have possibility of matching the first variable length chain character string at the predetermined variable length matching factor or higher from variable length chain character string identifying information and variable length chain character string position information for a second partial character string belonging to the set of second partial character strings; means for calculating a variable length chain matching factor between the first variable length chain character string and the variable length chain character string candidates; means for a selecting a second variable length chain character string with a matching factor of variable length chain equal to or higher than a predetermined matching factor of variable length chain with the first variable length chain character string from the variable length chain character string candidates; means for identifying the second document character string in which the selected second variable length chain character string exists from the character string identifying information for the selected second variable length chain character string; and means for calculating a character string similarity factor between the second character string in which the selected second variable length chain character string exists and the search character string containing the first variable length chain search character string based on the variable length chain matching factor.

According to another aspect of the present invention, there is provided an apparatus for locating a position where there exists a document character string in a document containing a variable length chain document character string and searchably stored through computer processing, the document character string being similar to a search character string containing a variable length chain search character string with a predetermined similarity factor or higher, the apparatus comprising means for locating the start and end positions of match in the variable length chain document character string for a partial character string of a length of M characters (M being a predetermined integer of one or more) from the top of the variable length chain search character string (hereinafter the partial character string of a length of M characters determined by the start and end positions being referred to a "valid matched character string"); means for locating the (i+i)-th valid matched character string satisfying the following conditions:

$$e(D,i)+1 < s(D,i+1) < e(D,i)+L+1,$$

and $$s(C,i+1) > e(C,i)-(M-1)$$

where
  s(D,i) is the start position of the i-th valid matched character string in the document;
  e(D,i) is the end position of the i-th valid matched character string in the document;
  s(C,i) is the start position of the i-th valid matched character string in a character string to be searched;
  e(C,i) is the end position of the i-th valid matched character string in a character string to be searched; and
  L is a predetermined integer of one or more; means for continuing the step of locating the (i+i)-th valid matched character string as long as the valid matched character strings can be located; means for calculating a similarity factor between the variable length chain search character string and a character string which exists between the start position of the first valid matched character string in the variable length chain document character string and the end position of the last valid matched character string in the variable length chain document character string based on information on existence of valid matched character strings in a character string at least between the start position of the first valid matched character string in the variable length chain document character string and the end position of the last valid matched character string in the variable length chain document character string; means for identifying the variable length document character string in response to the fact that the calculated similarity factor is equal to or higher than a predetermined similarity factor; and means for identifying a document character string containing the identified variable length chain document character string.

According to another aspect of the present invention, there is provided a medium for storing a program which searches a document character string which contains a variable length chain document character string, and which is similar to a search character string at a predetermined similarity factor or higher, said search character string containing a variable length chain search character string, in a document searchably stored through computer processing, the program comprising program code means for directing a computer to associate the variable length chain document character string with document character string identifying information for identifying a document character string in which the variable length chain document character string exists; program code means for directing the computer to associate a partial document character string of a length of M characters (M being a predetermined integer of one or more) from the variable length chain document character string with variable length chain document character string identifying information for identifying a variable length chain document character string in which the partial document character string exists; program code means for directing the computer to search a partial document character string matching a partial search character string of a length of N characters (N being a predetermined integer of one or more) extracted from the variable length chain search character string; program code means for directing the computer to identify a variable length chain document character string relating to the partial document character string matching the partial search character string from the variable length chain document character string identifying information for the partial document character string matching the partial search character string; and program code means for directing the computer to identify a document character string in which the identified variable length chain document character string exists from document character string identifying information for the identified variable length chain document character string.

The medium includes a floppy disk, a CD-ROM, an MO, a PD, and a storage device connected to a network. The program codes may be divided into a plurality of segments and stored in a plurality of media. In addition, the program may be compressed and stored in the medium. The medium is loaded into a system through various drives such as a floppy disk drive, a modem, or a serial port, or the like.

According to another aspect of the present invention, there is provided a medium for storing a program which searches a document character string which contains a variable length chain document character string, and which is similar to a search character string at a predetermined similarity factor or higher, said search character string containing a variable length chain search character string, in a document searchably stored through computer processing, the program comprising program code means for directing a computer to search a partial document character string matching a partial search character string of a length of N characters (N being a predetermined integer of one or more) extracted from the variable length chain search character string in an index file, in which index file the variable length chain document character string is associated with document character string identifying information for identifying a document character string in which the variable length chain document character string exists, and a partial document character string of a length of M characters (M being a predetermined integer of one or more) from the variable length chain document character string is associated with variable length chain document character string identifying information for identifying a variable length chain document character string in which the partial document character string exists; program code means for directing the computer to identify a variable length chain document character string relating to the partial document character string matching the partial search character string from the variable length chain document character string identifying information for the partial document character string matching the partial search character string; and program code means for directing the computer to identify a document character string in which the identified variable length chain document character string exists from document character string identifying information for the identified variable length chain document character string.

According to another aspect of the present invention, there is provided a medium for storing a program which creates a file for computer search from a document containing a plurality of variable length chains in a storage device accessible by a computer, the program comprising program code means for directing a computer to extract a first variable length chain from the document; program code means for directing the computer to store position information for the position in the document at which the first variable length chain appears; program code means for directing the computer to extract a first extended fixed length chain from the first variable length chain; and program code means for directing the computer to store information for identifying the first variable length chain in which the first extended fixed length chain exists and position information for the position in the first variable length chain at which the first extended fixed length chain exists.

According to another aspect of the present invention, there is provided a medium readable by a computer for storing a file for computer search, the medium comprising a character chain file for storing a plurality of variable length chains extracted from a document containing the plurality of variable length chains; a position information file for managing position information for the position in the document at which the plurality of variable length chains appear; an extended character chain file for storing an extended fixed length chain of a length of M characters (M being a predetermined integer of one or more) extracted from each of the plurality of variable length chains; and an extended position information file for storing information for identifying a variable length chain in which the extended fixed length chain exists, and position information for the position in the variable length chain at which the extended fixed length chain exists. Such unique file configuration allows it to easily perform ambiguity search when it is incorporated in a computer system. In addition, since overlapped character strings are compressed, the size of file may be reduced than a case where documents are stored as they are. Moreover, since overlapped character strings are not repeatedly searched, high speed search can be attained. The present invention is particularly effective for a document in which a same word repeatedly appears very often. While an embodiment represents position information for the positions at which overlapped character strings appear with numerals, the size for a whole document may be reduced by coding and compressing such numerals.

Referring to FIG. 1, there is shown a block diagram of a system configuration for implementing the present invention. In this configuration, a bus 101 is connected with a central processing unit (CPU) 102 having capabilities of arithmetic operation and input/output control, a main memory (RAM) 104 for loading a program and providing a work area for the CPU 102, a keyboard 106 for key entering commands, a character string to be searched and the like, a hard disk 108 which stores an operating system for controlling the central processing unit, a database file, a search engine, an index file and the like, a display device 110 for displaying a search result of database, and a pointing device (including a mouse, a track ball or the like) 112 for pointing any position on the screen of the display device 110 and communicating its position information to the central processing unit. Therefore, it will be readily understood that the present invention can be implemented on a conventional personal computer (PC), a workstation, or a combination of them. In addition, there is shown a storage medium 114 for storing a program code providing instructions to the CPU or the like in cooperation with the operating system to implement the present invention. The storage medium includes a floppy disk, a CD-ROM, an MO, a PD, and a storage device connected to a network. The aforementioned program code may be divided into a plurality of segments, or compressed for storage in the storage medium. The storage medium 114 is loaded into a system through various drives such as a floppy disk drive, a modem, or a serial port, or the like, whereby the system shown in FIG. 1 would be configured as the system of the present invention.

A desirable operating system is a one such as Windows (trademark of Microsoft), OS/2 (trademark of IBM), or X-window (trademark of MIT) on AIX (trademark of IBM) which supports GUI multiwindow environment as a standard feature. However, the present invention may be implemented in a character-base environment such as PC-DOS (trademark of IBM) or MS-DOS (trademark of Microsoft), and is not limited to a specific operating system environment. In addition, FIG. 1 shows a system in a stand-alone environment. However, since, in general, the database file requires a disk drive with a large capacity, it may be arranged to implement the present invention as a client/server system in which a database file and a search engine are placed on the server machine, the client machine is LAN connected to the server machine through Ethernet or Token-Ring, and only a display controller is placed on the client machine to view results of search.

Figure 2:
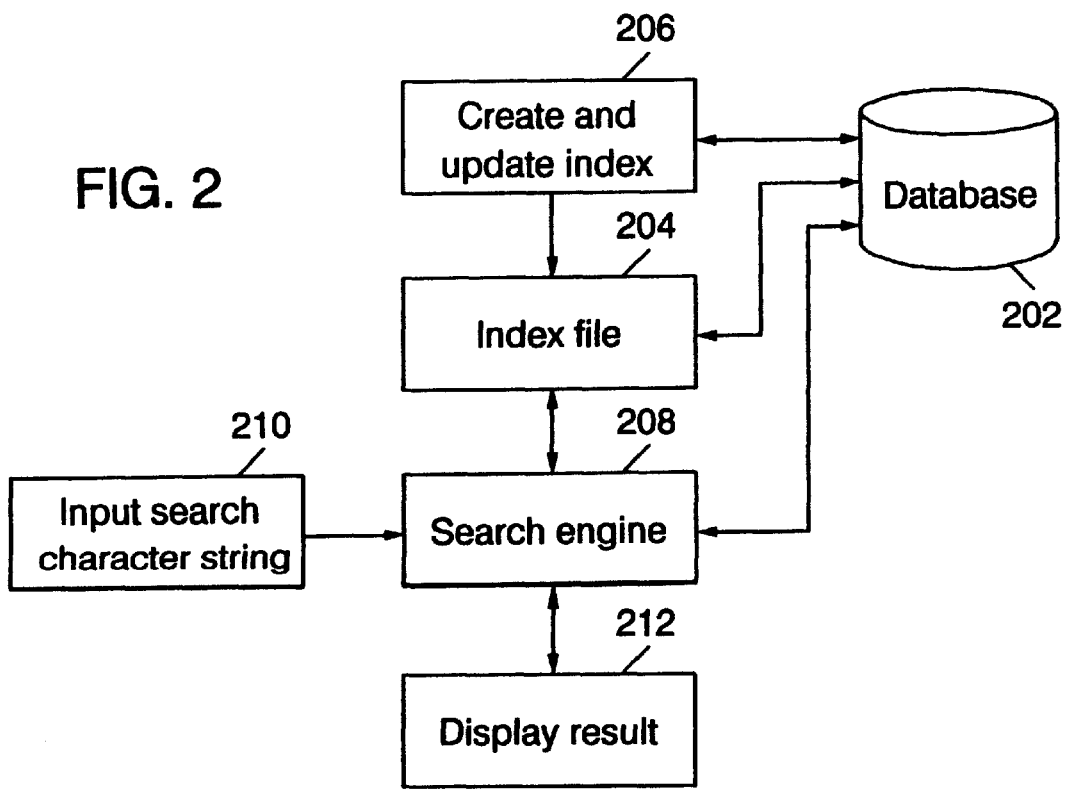
FIG. 2 is a block diagram of process elements.

The system configuration of the present invention will be described by referring to the block diagram of FIG. 2. It should be noted here that components indicated by individual blocks in FIG. 2 are individually or collectively stored in the hard disk 108 of FIG. 1 as data files or program files. The database 202 is assumed by the present invention to be a one storing a plurality of documents such as a news article database or a patent specification database. However, it should be noted that the application of the present invention is not limited to search for a database consisting of a plurality of documents, but it can be applied to search in a single document. In this case, the content of individual documents is searchably stored in the document file format. Furthermore, individual documents are provided with unique document numbers. Preferable document numbers are sequential numbers in ascending order beginning with one. However, in the case of the patent specification database, the application number or laid-open number may be used as a unique document number. In addition, a symbol such as "ABC" or "&XYZ" may be used to identify the individual documents instead of the sequential number. However, because more bytes are necessary to represent such identification symbol than numerals, it is preferable in practical use to identify the document with the sequential number.

In general, since it takes a long processing time to directly search enormous contents such as news articles or patent specifications stored in the database 202, an index file 204 is previously created by an index creation/update module 206 for the contents of all news articles stored in the database 202. According to an embodiment of the present invention described later, the thus created index file 204 comprises four files of a character chain file, a position information file, an extended character chain file, and an extended position information file. The character chain file stores where in the position information file fixed length chains, variable length chains, delimiter patterns and document numbers corresponding thereto, and position numbers in the document are positioned. The position information file stores document numbers and position numbers in the document. The extended character chain file stores where in the extended position information file extended character chains, variable length chain numbers and position numbers in the variable length chain corresponding thereto are positioned. The extended position information file stores variable length chain numbers and position numbers in the variable length chain.

In addition, the database 202 may be a one managing individual documents as separate files, or a one sequentially arranging all documents in a consecutive single file. In summary, it is essential that individual documents are provided with unique numbers, and the content of individual documents can be accessed with such unique numbers. In the former case, the database 202 manages a table which causes the unique numbers for individual documents to correspond to actual file names storing the documents. In the latter case, the database 202 manages a table which causes the unique numbers for individual documents to correspond to offset in the single database file and the size of document. A search engine 208 has capabilities to search the index file 204 with a search character string given by a search character input module 210 as an input, and to return a document number(s) of document containing the input search character string and a position(s) at which the input search character string appears in the document. The search character input module 210 preferably consists of a dialogue box in the multiwindow environment, in the input box of which the desired character(s) to be searched is input through the keyboard 106.

Furthermore, according to a feature of the present invention, the search character input module 210 allows it to input the similarity factor for ambiguity search in a value of 0–1 (it may be numerals of 0–100 based on percentage). Thus, the search character input module 210 displays a slider or scroll bar which has a handle pointing any position between zero and one. The handle of slider points one as default, and can be manipulated to point another value by dragging and moving it with the mouse 112.

A result display module 212 accesses the database 202 based on the document number as the result of search given by the search engine 208, and the value of position at which the search character appears in the document, and displays a line corresponding to that position in the document preferably in a separate search result display window. If the search result cannot be contained in one screen of the window, a scroll bar appears so that the user can sequentially view the search result by clicking it.

In the present invention, files are created, which index all of continuation of characters belonging to a character set C (variable length chains), all of continuous N characters not belonging to the character set C (fixed length chains), their positions in the document, and division information in document with the document (a document chain file 302, and a position information file 304). Here, the "character set C" means a predetermined set of characters, and preferably alphabet ('A'–'Z, ' and 'a'–'z'). However, it is contemplated to be characters used in other languages such as German, French, Italian, or Russian, to impose a condition that the character should be of single byte, to be alphanumeric including double byte characters, and to add several symbol characters, special symbols or the like such as "?", "!" or "'". Moreover, the "division information in document" means typically a delimiter in document sentence such as "." or ",", and a delimiter in document in a broader sense such as "Chapter 1", "Summary", a blank line, or a blank character (s). Then, files are created in response to the variable length chain, which index all of continuous N' characters in all variable length chains (extended fixed length chains) and their positions in the variable length chains with the variable length chains (an extended character chain file 306, and an extended position information file 308).

However, the four files of the document chain file 302, the position information file 304, the extended character chain file 306, and the extended position information file 308 are not necessarily physically different files, but are sufficient to be stored in such a manner that the content controlled by each file can be logically processed.

In a preferred embodiment of the present invention, the first processing necessary for creating the index file is to normalize the character string which is processing in the following. When the document to be searched is particularly a Japanese document file, single-byte and double-byte characters may be intermixed. Then, processing is performed to, for example, replace single-byte characters with corresponding double-byte characters (or vise versa), and lowercases with uppercases (or vise versa). The normalization of character string is not essential component of the present invention.

The detail of normalization may be changed to normalize single-byte characters to double-byte characters other than alphabet, or to only normalize non-delimiter languages, or by change of the search condition for differentiate the single-byte characters from the double-byte characters, or user specification.

The next step for creating the index file is, for all characters to be searched in the normalized character string and not belonging to the character set C, to extract continuous N characters starting from these characters (hereinafter called "fixed length chains"), and to store them in the index file together with the document number and the position number in document. However, N≧1, and N=2 is suitable for Japanese, Chinese and Korean.

It is desirable not to search continuation of a character belonging to the character set C and an adjacent blank character in order to reduce the size of the index file.

The next step to create the index file is to extract continuation of characters in the normalized character string and belonging to the character set C (variable length chains), and to store them together with the document number and the position number in document in the index file. The character set C may be defined to be other than alphabet. In such case, the character string may contain a plurality of variable length chains in which character strings are continuous. In such case, while the character string may include a plurality of variable length chains, a variable length chain can be extracted by using a blank, line feed, ", ", ". ", "!", or "?" as a delimiter. For example, in the case of "Boys be ambitious." or "Boys (line feed) be ambitious. ", three variable length chains of "Boys", "be", and "ambitious" can be extracted. In the preferred embodiment of the present invention, the case of "line feed" following "–" and not including any blank before or after it, continuation of characters before or after it may be determined to be a single variable length chain. Accordingly, even in the case such as "Boys be ambi-(line feed)tious", three variable length chains of "Boys", "be", and "ambitious" are extracted. In addition, it may be possible to perform normalization such as conversion between uppercases and lowercases, conversion between the plural and the singular, and conversion of 15 tense from the past or past perfect tense to the present tense, as desired.

In the preferred embodiment of the present invention, every individual documents are divided into blocks in a manner that they are meaningful in search, and division information is stored in the index file. The document may be divided into blocks by detecting line feed, a period, punctuation, "Chapter X", or "Section X", detecting a blank line, or detecting the paragraph number in a patent specification, or a certain number of characters may be incorporated in one block. These blocks are assigned a series of numbers or block numbers. According to the preferred embodiment of the present invention, a specially defined delimiter pattern is stored together with the document number of the document and the position information in the document for characters at the boundaries of blocks.

Several different division methods can be obtained by defining several types of delimiter patterns. However, the delimiter pattern should be defined not to overlap character chains being extracted from a normalized character string. In the embodiment, since one-byte codes are converted into two-byte codes through the normalization, if two bytes are assumed to be one word, when the value of the word is 255 or less, it is not applicable to a normal character code. Then, any word value between 0 and 255 can be individually assigned to several types of delimiter patterns.

The advantage to store the division information in such format similar to that of the character chain are as follows:
Easy to create and update the index. No particular processing is required for the division information; and
The capacity of the index is not significantly increased. For example, increase of the capacity is significantly small when compared with a format to append corresponding block numbers to every position numbers in document.

The position number in document is unique sequential numbers in the document block assigned to all characters to be searched in the document. Then, the position number in document for the first character in a character chain is determined to be the position number in document for that character chain. If a fixed length chain is less than N at the end of continuation of characters not belonging to the character set C together with subsequent characters, predefined padding characters such as X'00' are padded to make the number of characters N.

The next step to create the index file is, for all characters in all variable length chains, to extract continuous N' characters starting from these characters (hereinafter called "extended fixed length chains"), and to store them in the index file together with the extended character chain number and the position number in extended character chain. However, N'≧1, and N'=3 is suitable if the character set C is alphabet. The search speed can be improved when an extended fixed length chain is extracted after appending a start mark and an end mark before and after a variable length chain, respectively. For example, when "$" and "¥" are used as the start and end marks, respectively, extended fixed chains "$ca", "cat", "at¥", and "t¥" are extracted from a variable length chain "cat. " Then, it becomes possible to eliminate mixing of "communication" or the like as noise in determining matching of "$ca" or the like.

For example, it is assumed that a document containing a sentence "data base system-123" at the beginning is contained in the database 202 (FIG. 2). If it is determined not to search blank characters adjacent to the characters belonging to the character set C on the assumption that the above character set C is alphabet, when a position number in document are appended to each character in this sentence, they become as follows.

| Position number in document for characters | 1234 | 5678 | 9 10 11 12 13 14 15 16 17 18 19 |
|---|---|---|---|
| Normalized character string | data | base | system - 1 2 3. |
| Delimiter method 1 | | | | |

Then, it is assumed that the document number for that document is 1, and that the number of characters N for the fixed length chain is 2. Then, individual fixed length chains (length 2), delimiter patterns and document numbers associated thereto, and position numbers in document are as follows.

| Fixed length chain | Document number | Position number in document |
|---|---|---|
| -1 | 1 | 15 |
| 12 | 1 | 16 |
| 23 | 1 | 17 |
| 3. | 1 | 18 |
| 3 | 1 | 19 |
| Delimiter pattern 1 | 1 | 19 |

Individual variable length chains, document numbers associated thereto, and position numbers in document are as follows.

| Variable length chain | Document number | Position number in document |
|---|---|---|
| data | 1 | 1 |
| base | 1 | 5 |
| system | 1 | 9 |

Then, it is assumed that the numbers appended to the variable length chains are sequentially 1, 2, and 3, and that the number of characters N' of the extended fixed length chain is 3, individual extended fixed length chains (length 3), variable length chain number associated thereto, and position numbers in variable length chain are as follows.

| Extended fixed length chain | Variable length chain number | Position number in variable length chain |
|---|---|---|
| dat | 1 | 1 |
| ata | 1 | 2 |
| ta | 1 | 3 |
| a | 1 | 4 |
| bas | 2 | 1 |
| ase | 2 | 2 |
| se | 2 | 3 |
| e | 2 | 4 |
| sys | 3 | 1 |
| yst | 3 | 2 |
| ste | 3 | 3 |
| tem | 3 | 4 |
| em | 3 | 5 |
| m | 3 | 6 |

When it is allowed to append a plurality of variable length chain numbers and position numbers in variable length chain to the extended fixed length chain, the whole capacity can be compressed, and high efficiency can be obtained particularly for a document with many overlapped words. In addition, since overlapped searches can be eliminated by putting such overlapped character strings together, high speed search can be performed.

Usefulness of the division information (delimiter) in document in search will now be described.

When a document is composed of the title, the abstract, and the body, for example, it would be a common demand to perform search only for a specific portion such as the title, the abstract. Such search can be attained by storing delimiter patterns and their position information for the end of title and the end of abstract.

It would be a common demand to perform search with awareness of strength of association between a plurality of character strings in the context. For example, it is anticipated that there is higher possibility of stronger association when the character strings are in the same paragraph rather than when they are merely in the same document, and that the association is further stronger if they are in the same sentence. It becomes possible to search a document in which a plurality of character strings are in the same block by storing delimiter patterns and their position information for the end of paragraphs or sentences so that search with awareness on the strength of association can be performed.

Figure 3:
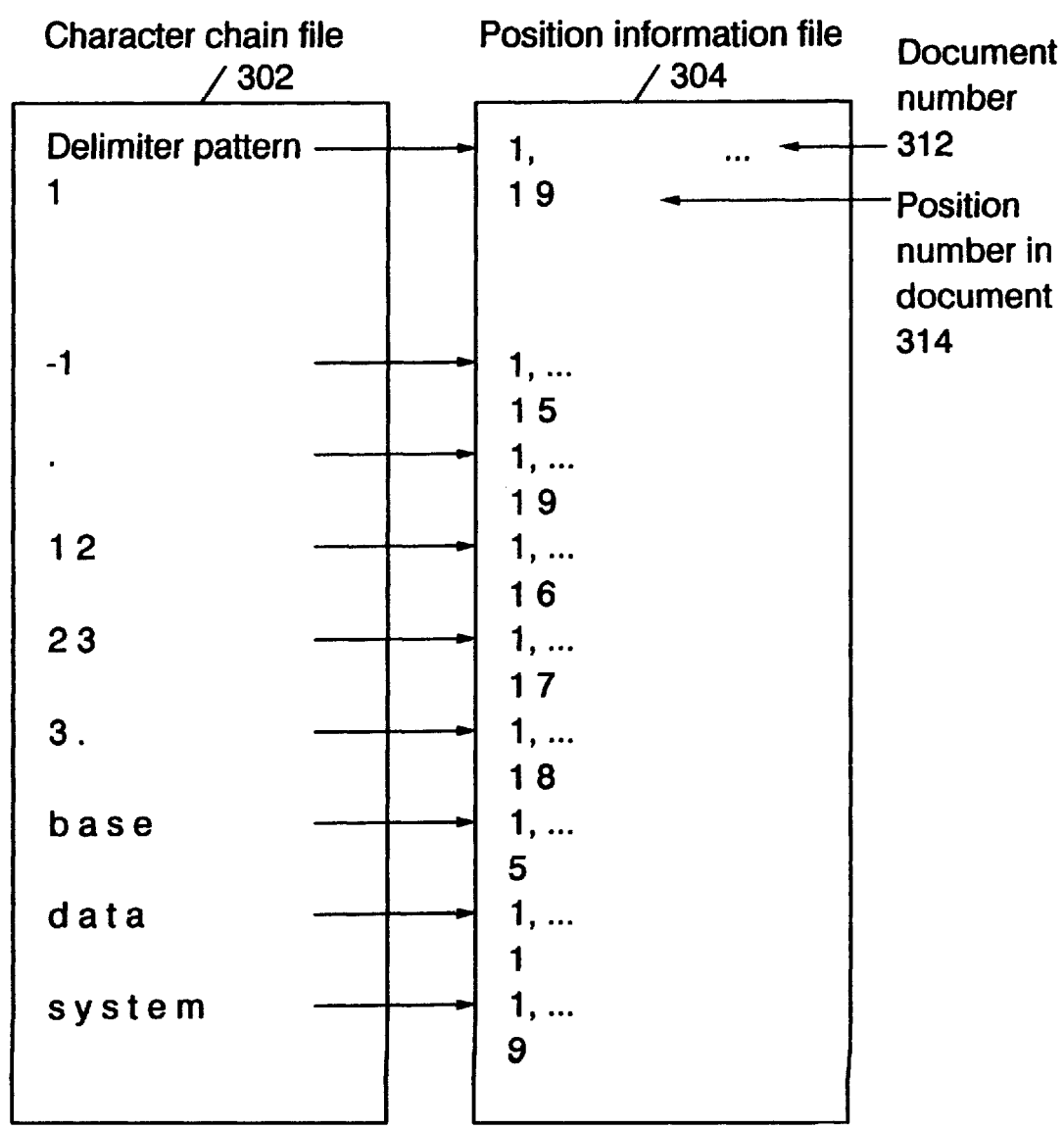
FIG. 3 is a structure of index file.
Figure 4:
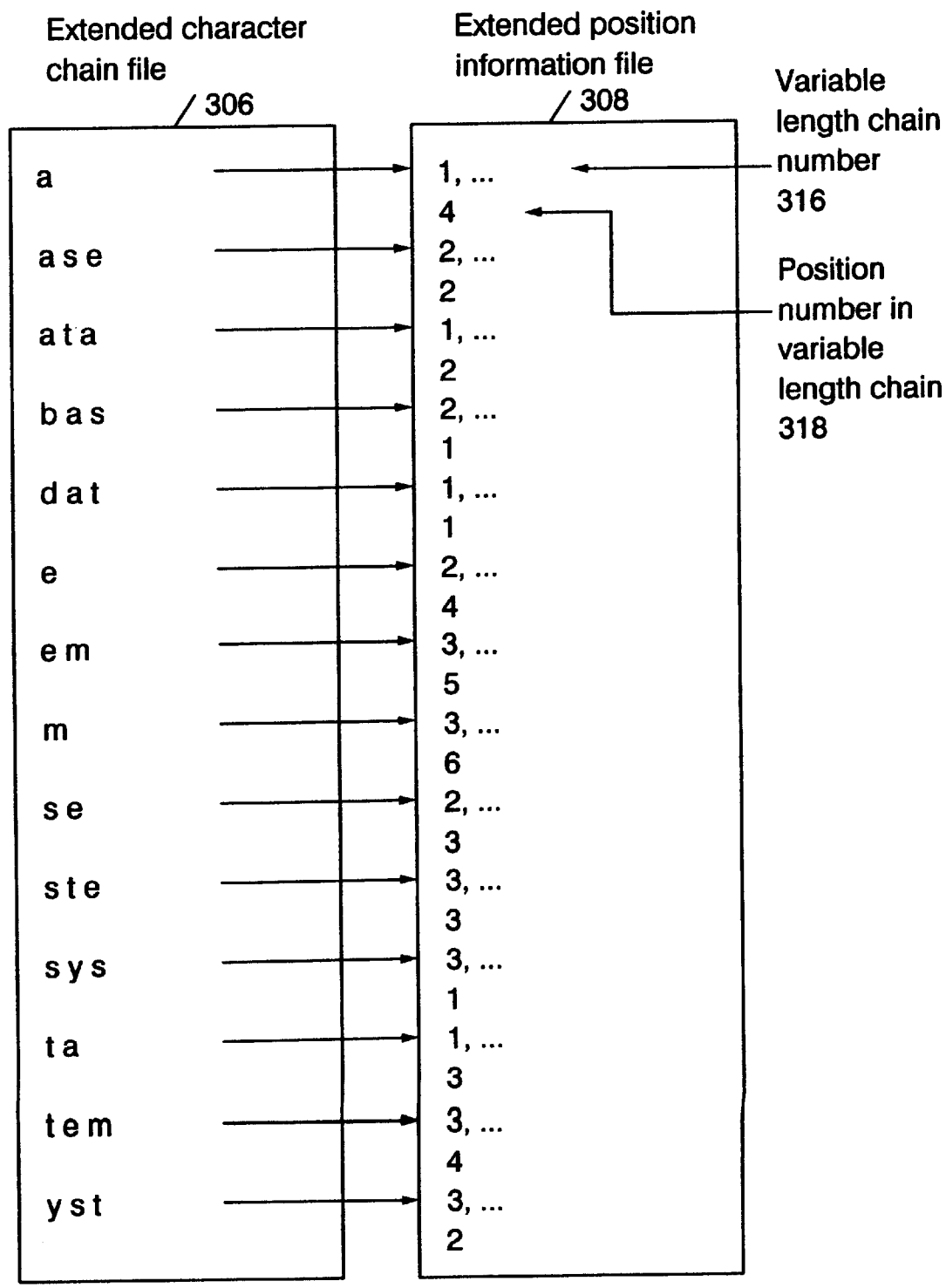
FIG. 4 is a structure of index file.

It is necessary to store the character chain, the delimiter pattern, its document number, and the position number in document in a manner that they can be efficiently extracted in searching. Thus, in this embodiment, as shown in FIGS. 3 and 4, the index file is composed of four files of the character chain file 302 (a file mainly storing the fixed length chain, the variable length chain, and the delimiter pattern), the position information file 304 (a file mainly storing the document number, and the position number in document), the extended character chain file 306 (a file mainly storing the extended fixed length chain), and the extended position information file 308 (a file mainly storing the variable length chain number, and the position number in variable length chain). The character chain file 302 is arranged to store information on where the fixed length chain, the variable length chain, the delimiter pattern, and the document number 312 and the position number in document 314 associated to them are positioned in the position information file 304. The position information file 304 is arranged to store the document number 312 and the position number in document 314. The extended character chain file 306 is arranged to store information on where the extended fixed length chain, and the variable length chain number 316 and the position number in variable length chain 318 associated to it are positioned in the extended position information file 308. The extended position information file 308 is arranged to store the variable length chain number 316 and the position number in the variable length chain 318.

While the embodiment is described for a document in which the delimiter language and the non-delimiter language are intermixed, those skilled in the art would easily understand that the present invention can be applied to a document only of the delimiter language or a document only of the non-delimiter language. In the case of only the non-delimiter language, in general, since there is no need to take the variable length chain into account, the extended character chain file 306 and the extended position information file 308 are not required (however, variable length chains may exist even in a non-delimiter language document if the document consists of keywords extracted from the abstract as in a patent specification.)

In FIG. 3, entries in the character chain file 302 are the fixed length chains, the variable length chains and the delimiter patterns in all documents in the database 202. The entries in the character chain file 302 are preferably sorted in ascending order in the order of code values of normalized character chains so as to enable dichotomizing search. "Delimiter pattern 1,"-1,""12" and the like are individual entries in the character chain file 302. Here, "delimiter pattern 1, " for example, collectively indicates delimiters of a sentence or phrase such as ", ", or ". " and is assigned a special two-byte value.

The position information file 304 of FIG. 3 stores at least one document number 312 corresponding to individual entries in the character chain file 302, and at least one position number in document 314 associated to each of the individual document numbers.

To cause the entries in the character chain file 302 to correspond to those in the position information file 304, although not shown, the individual entries in the character chain file 302 have offset from the beginning of the position information file 304 for corresponding entries in the position information file 304, and information on the size of the entries in the position information file 304. That is, in FIG. 3, for example, the character chain file 302 seeks the position information file 304 from its beginning from the information on offset stored therein with respect to "delimiter pattern 1, " and reads number of bytes specified in the size information from the sought position, whereby it is enabled to collectively read with respect to "delimiter pattern 1 " position number values in document of 16, 19, . . . in the document number 1, position number values in document relating to the document number 2, . . . , and position number values in document relating to the document number n, if any. In addition, by storing information indicating the range where the fixed length chains, the variable length chains and the delimiter patterns are stored, it is possible to determine to which of the fixed length chain, the variable length chain or the delimiter pattern the information stored in the character chain file 302 belongs.

Generally, the position number values in document relating to the document number i are stored, for example, in a form of (document number i: 4 bytes), (number of position number in document k: 4 bytes), (first position number in document: 4 bytes), . . . (k-th position number in document: 4 bytes). Although, in this example, it is arranged to take 4 bytes for storing the absolute position of the document as a field for storing the position number in document, it is desirable in practice to store offset from one previous position number in document so that the number of bytes is saved to 1–3 bytes. It is also desirable to reduce the file capacity by performing compression through coding. It is true to the fields for storing the document number and the position number in document.

In FIGS. 3 and 4, entries in the extended character chain file 306 are the extended fixed length chains in all variable length chains in the character chain file 302. The entries in the extended character chain file 306 are preferably sorted in ascending order in the order of code values of normalized character chains so as to enable dichotomizing search. "dat", "ata" and the like are the individual entries of the extended character chain file 306.

The extended position information file 308 of FIG. 4 stores at least one variable length chain number corresponding to the individual entries in the extended character chain file 306, and at least one position number in variable length chain associated to each of the individual variable length chain numbers.

Now, referring to FIG. 5, the process for creating the index file will be described. This process is a one which is performed by the index creation/update module 206 of FIG. 2 when initially building the database 202, or adding or deleting a document to or from the database 202.

Figure 5:
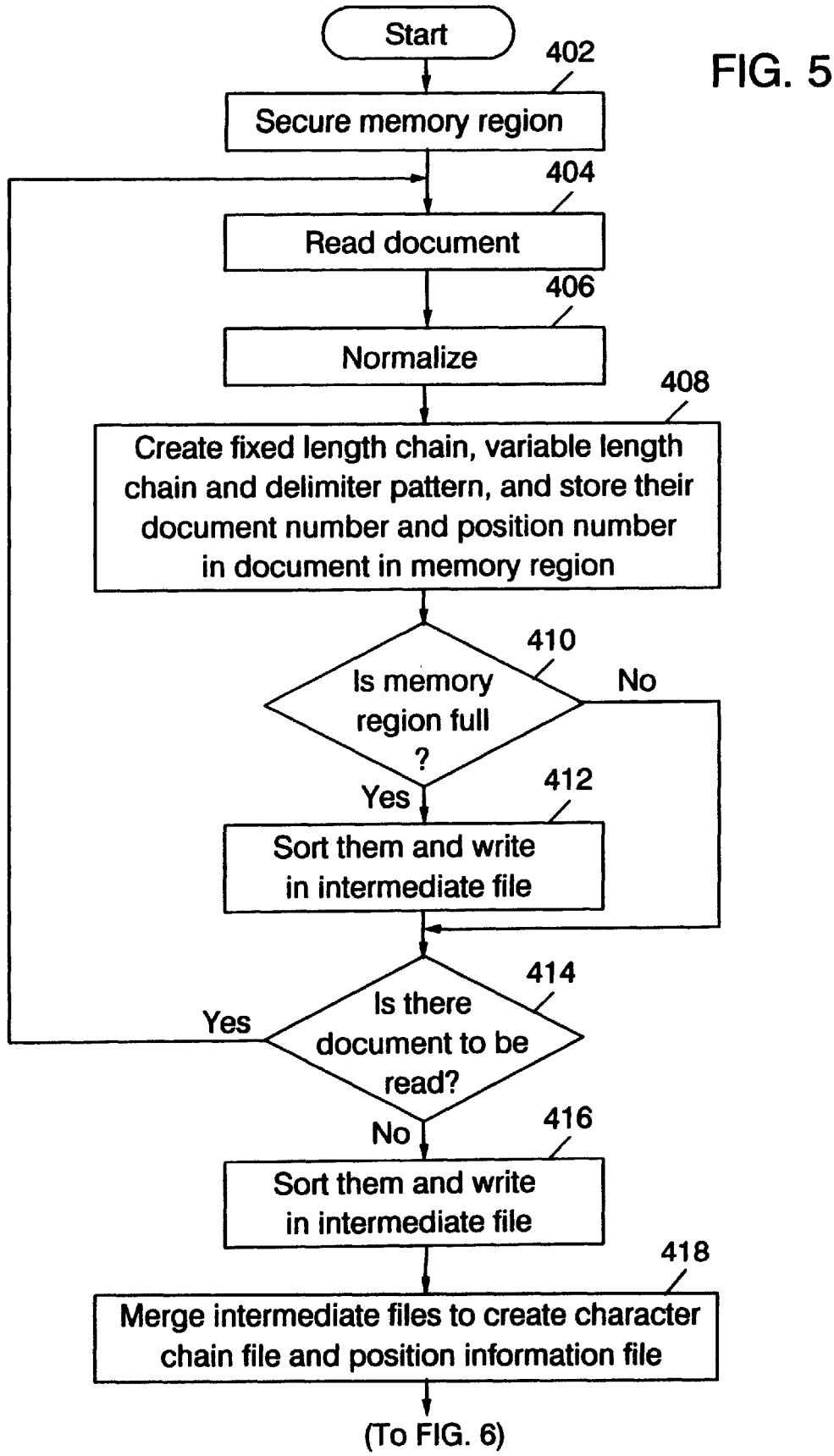
FIG. 5 is a flowchart showing an index file creation process.
Figure 6:
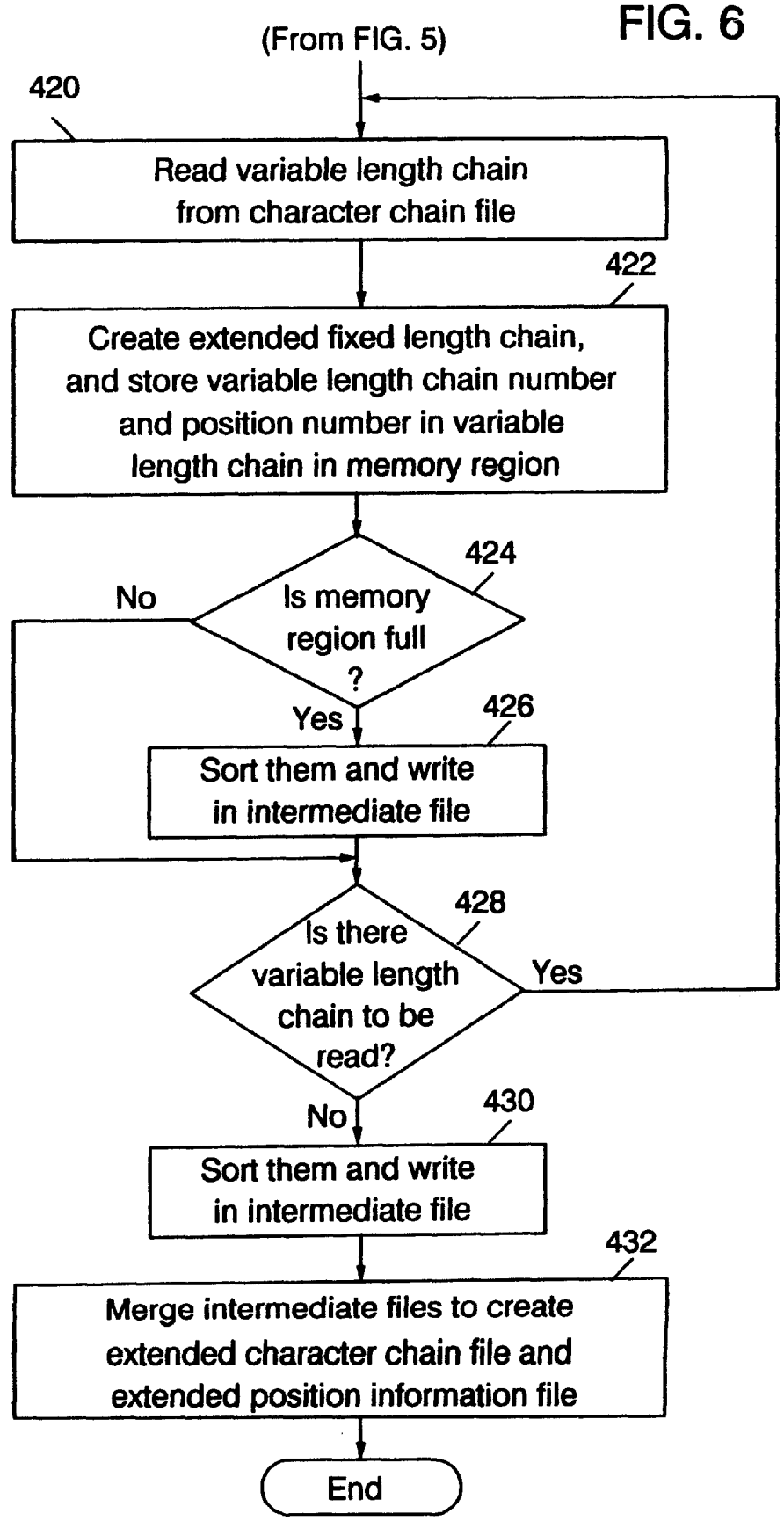
FIG. 6 is a flowchart showing an index file creation process.

In FIG. 5, step 402 performs to ensure a memory region. This is a process to obtain a work area with a predetermined size on the RAM 104 by calling a function of the operating system.

In step 404, one document is read from the database 202 to the memory region preferably obtained in step 402.

In step 406, the above-mentioned normalization is performed for the document read in step 404.

In step 408, fixed length chains, variable length chains, and delimiter patterns are created by scanning the normalized document. Then, the fixed length chains, the variable length chains, delimiter patterns, the document number of the document, as well as the position numbers in document of the fixed length chains, the variable length chains and the delimiter patterns are stored in the memory region obtained in step 402.

In the process in step 408, as the fixed length chains, the variable length chains, the delimiter patterns, the document number and the position numbers in document are being stored in the memory region previously obtained in step 402, the empty space in thus obtained memory region may be exhausted. Then, in step 410, a process is performed for checking whether or not the obtained memory region is full. If so, in step 412, the fixed length chains, the variable length chains, and the delimiter patterns, all of which are stored in the memory region, and the document number of the document, as well as position information in document of the fixed length chains, the variable length chains and the delimiter patterns are sorted based on, for example, character code values of the fixed length chains, the variable length chains and the delimiter patterns, the document number, and the position numbers in document, and written to the disk 108 (FIG. 1) as an intermediate file, whereby the memory region in which data written in the intermediate file is stored is released for use in the subsequent process. Then, the process proceeds to step 414.

If it is determined in step 410 that there still remains a space in the memory region, then the process immediately proceeds to step 414.

In step 414, it is determined that there remain documents not yet read in step 404 in the database 202. If so, the process returns to step 404.

If it is determined in step 414 that all documents in the database 202 have been completely read, then the fixed length chains, the variable length chains and delimiter patterns, all of which are not written to the memory region obtained in step 402 and remain, and the document number of the document, as well as the position numbers in document of the fixed length chains, the variable length chains and the delimiter patterns are also sorted based on the character code values of the fixed length chains, the variable length chains and the delimiter patterns, the document number, and the position numbers in document, and written to the disk 108 (FIG. 1) as an intermediate file.

Since writing of the intermediate files in steps 412 and 416 causes a plurality of intermediate files to exist on the disk 108, and each of these intermediate files are previously sorted, step 418 performs a process to create the character chain file 302 and the position information file 304 shown in FIG. 3 from these intermediate files with a conventional merge/sort technique, and to store them on the disk 108. In addition, since the character chain may repeatedly appear several times in the original intermediate files, a process is performed here to put the entries of the same overlapped character chain into one, and to associate the related document number and the position number in document to it. Thereafter, the intermediate files are no longer necessary and deleted.

In step 420, one variable length chain is read from the character chain file 302 into the memory region preferably obtained in step 402. In the preferred embodiment of the present invention, since the storage position of the variable length chain in the character chain file 302 is stored in the character chain file 302 at the time it is created, it is possible to immediately access the top position of the variable length chain in the character chain file 302.

In step 422, the extended fixed length chain is created by scanning the variable length chain. Then, the extended fixed length chain, the variable length chain number of that variable length chain, the position number in variable length chain of the extended fixed length chain are stored in the memory region obtained in step 402.

In the process in step 422, as the extended fixed length chain, the variable length chain number and the position number in variable length chain are being stored in the memory region previously obtained in step 402, the empty space in thus obtained memory region may be exhausted. Then, in step 424, a process is performed for checking whether or not the obtained memory region is full. If so, in step 426, the extended fixed length chains, the variable length chain number, and the position information in variable length chain, all of which are stored in the memory region, are sorted based on, for example, character code values of the extended fixed length chains, the variable length chain number and the position number in variable length chain, and written to the disk 108 (FIG. 1) as an intermediate file, whereby the memory region in which data written in the intermediate file is stored is released for use in the subsequent process. Then, the process proceeds to step 428.

If it is determined in step 424 that there still remains a space in the memory region, then the process immediately proceeds to step 428.

In step 428, it is determined that there remain variable length chains not yet read in step 420 in the character chain file 302. If so, the process returns to step 421.

If it is determined in step 428 that all variable length chains in the character chain file 302 have been completely read, then the extended fixed length chains which are not written to the memory region obtained in step 402 and remain, the variable length chain number, and the position number in variable length chain are also sorted based on the character code values of the extended fixed length chains, the variable length chain number and the position number in variable length chain, and written to the disk 108 (FIG. 1) as an intermediate file.

Figure 7:
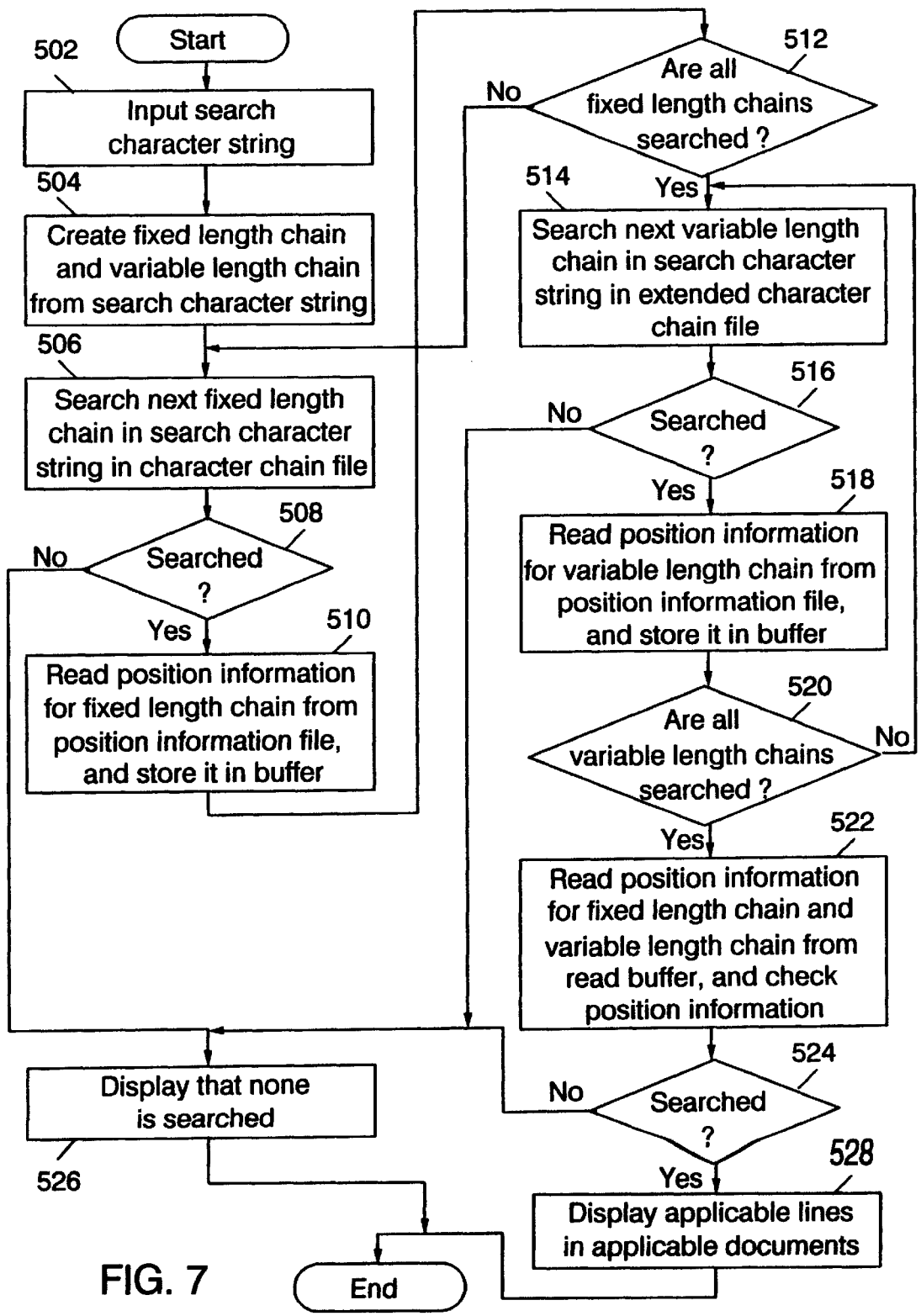
FIG. 7 is a flowchart showing a character string search process using an index file.

Since writing of the intermediate files in steps 426 and 430 causes a plurality of intermediate files to exist on the disk 108, and each of these intermediate files are previously sorted, step 432 performs a process to create the extended character chain file 306 and the position information file 308 shown in FIG. 7 from these intermediate files with a conventional merge/sort technique, and to store them on the disk 108. In addition, since the character chain may repeatedly appear several times in the original intermediate files, a process is performed here to put the entries of the same overlapped character chain into one, and to associate the related variable length chain number and the position number in variable length chain to it. Thereafter, the intermediate files are no longer necessary and deleted.

Now, an example of process performing character string search by using the index file created as above will be described by referring to the flowchart of FIG. 7. In step 502, first, a process is performed to display, for example, a dialogue box with an input box, and to prompt the user to input a search character string in the input box.

When the user inputs the search character string in the input box, and clicks the OK button, the search character string is normalized, if required, and then, in step 504, a fixed length chain and a variable length chain of N characters are created based on the same rule when the index file is created from that search character string.

In step 506, the fixed length chain is searched from the character chain file.

In step 508, if it is determined that no fixed length chain is found, a message box is preferably displayed in step 526 for indicating that the search character string cannot be found, and the process ends.

In step 508, if it is determined that a fixed length chain is found, since the position information file returns one or more document numbers and at least one position number in document at that document number, this information is once stored in step 510 in a predetermined buffer region in the main memory or on the disk for the subsequent process.

In step 512, it is determined whether all fixed length chains created from the search character string have been searched. If so, the process proceeds to step 514. If not, the process returns to step 506 where the search process is performed for the next fixed length chain by using the character chain file.

In step 514, a variable length chain is searched from the extended character chain file and the extended position information file.

In this case, when variable length chains having excess characters before or after it are eliminated, it is possible to avoid noise such as "cat"->"communication". Specifically, in case where there are three or more characters before or four or more characters after a matched character string, it may be possible to eliminate these characters, to subtract a predetermined value from the similarity factor for one character existing before or after the matched character string as penalty, or to multiply a predetermined value (positive value less than one) on it.

In step 516, if it is determined that no variable length chain is found, preferably, step 526 presents a message box indicating that no search character string is found, and ends the process. Although, in the preferred embodiment of the present invention, the message is displayed on the display device 110 of FIG. 1, it may be possible to transfer the message to another location through a network.

If it is determined in step 516 that a variable length chain is found, because the extended position information file 308 returns one or more variable length chain numbers 316, the position information file 304 returns in step 518 one or more document numbers 312 for subsequent processing based on this information and at least one position number in document 314 at these document numbers which are then once stored in a predetermined buffer region in the main memory or on the disk.

In step 520, it is determined whether all variable length chains created from the search character string have been searched. If so, the process proceeds to step 522. If not, the process returns to step 514 where the search is performed with the next variable length chain by using the extended character chain file, and the extended position information file.

In step 522, check is performed on the position information for the fixed length chains stored in the buffer in step 510 and the position information for the variable length chains stored in the buffer in step 518 to once store the document numbers containing the character strings matching the search character string and their position numbers in the buffer region. If it is determined that the search character string is found, the contents of documents in the database 202 are accessed in step 528 from these document numbers and the position numbers in document, and the applicable lines for the document in which the document search character string exists are preferably displayed in the individual windows.

If it is determined in step 524 that the search character string is not found, a message box indicating that the search character string is not found is preferably displayed in step 526, and the process ends.

In order to check that the search character string appears in a specific block in the document (for example, the third block), it is sufficient to count delimiter positions in the document which appear until the position where the search character string appears in the document, to check at which block (x-th block) the search character string is positioned in the document, and to compare it with the specified block number.

The process shown in FIG. 7 is to perform so-called strict search by using the index file. However, according to the present invention, it is also possible so-called ambiguity search process for character strings including those similar to a specified character string in individual documents in the database at a high speed by using an index file. Specifically, this scheme specifies a character string to be searched, and search accuracy (larger than zero but equal to one or less) to identify documents including "similar character strings" of which the "similarity factor" with the character string to be searched is higher than the specified search accuracy, and positions in document of the "similar character strings".

When English, a delimiter language, is considered by taking it as an example, English character strings in which arrangement of characters resembles, and the meaning of which resembles include:

Different expression
"database", "data base", "data-base"
Inflection
"communicate", "communication"
Typographical error
In case of "communication":
"comunication": missing of character
"commnuication": reversal of character
"communanication": excess character
Hyphenation
"communication", "communi-cation"
Variation of phrase
"new technology", "new CMOS technology"

It is common to them that most characters continuously match, but there is a missing character or an excess character. Similar examples may be found in Japanese, Korean, and Chinese.

Rule for Determining Similar Character Strings and Similarity Factor

First, description is given for a case of a search character string consisting of only the fixed length chain on a rule for determining similar character strings and a similarity factor. It is a general rule to collect character strings as similar character strings which have the same sequential relationship with characters in an input character string and at positions close to it in a some extent from character strings continuously match each other with the input character strings over M characters or more, and to determine a similarity factor from the number of matched characters and the number of non-matched characters.

First, terms used in the description are defined.

A section in which a character string to be searched continuously matches the document text over M characters or more. The longest character string is selected from those starting from a same character.

EXAMPLE

Character string to be searched: communication
Document text: . . . the communi-. . .
If M=2, "communi" is the matched character string. In this case, because of the longest selection, "com" or "commu" is not referred to a matched character string. In addition, "t" is also not a matched character string because it is less than two characters.

It is a matched character string of M characters constituting a similar character string. A valid matched character string in a search character string is called a valid matched search character string; a valid matched character string in a document is called a valid matched document character string. Since the valid matched search character string and the valid matched document character string match for their contents, they are simply called a valid matched character string unless otherwise distinction is required.

Non-matched characters to be contained in a similar character string should be continuous L characters. L is a constant of one or more.

Now, description is given on how to select a "similar character string" and how to digitize a "similarity factor".

The first matched character string in the order in a document is to be the first valid matched character string, where it is expressed that $s(D,i)$ is the start position of the i-th valid matched document character string;

$e(D,i)$ is the end position of the i-th valid matched document character string;

$s(C,i)$ is the start position of the i-th valid matched search character string; and $e(C,i)$ is the end position of the i-th valid matched search character string.

When the i-th valid matched document character string has been determined, the (i+1)-th valid matched document character string is determined in the following manner.

The first matched character string satisfying the following two conditions a) and b) (Equations 1 and 2) is made the (i+1)-th valid matched character string.

a) $e(D,i)+1 \leq s(D,i+1) \leq e(D,i)+L+1$ [Equation 1]

This means that up to L characters are allowed as excess characters which may exist between the i-th valid matched document character string and the (i+1)-th valid matched document character string.
(Refer to Example 3 Described Later.)

b) $s(C,i+1) > e(C,i)-(M-1)$ [Equation 2]

The process is continued until such valid matched document character string cannot be selected.

(3) Determination of "Similar Character String" and its "Similarity Factor" (Degree of Similarity)

When the valid matched document character string cannot be selected any more, a "similarity factor" is calculated from the following equation by assuming that a "similar character string" is from the first character of the first valid matched character string to the last character of the last valid matched character string. Similarity factor=minimum (number of characters in a character string to be searched belonging to a valid matched search character string/number of characters of the character string to be searched, number of characters in a "similar character string" belonging to the valid matched document character string/number of characters of the "similar character string")÷tm [Equation 3]

The similarity factor can be calculated from the number of characters not belonging to a valid matched document character string. Similarity factor=1-maximum (number of characters in a character string to be searched not belonging to a valid matched search character string/number of characters of the character string to be searched, number of characters in a "similar character string" not belonging to the valid matched document character string/number of characters of the "similar character string")÷tm [Equation 4]

How to count number of characters in "similar character string" belonging to valid matched character string When two characters correspond to the same characters in the character string to be searched, the first character is counted as 1, and the second one is counted as 0.5. Otherwise, one character is counted as 1. (Refer to Example 4 described later.) Order of determination of "similar character string"

The first "similar character string" is determined by starting comparison from the top of document. When the i-th "similar character string" has been determined, the (i+1)-th "similar character string" is determined by starting comparison from the first character which is behind a character at the top of the i-th "similar character string", and does not belong to a valid matched character string constituting the i-th "similar character string".

A "similarity factor" considerably agreeing with general human determination can be calculated on whether or not arrangement of characters resembles by setting the constants L and M to suitable values.

When the "similarity factor" becomes the maximum value of 1, character strings completely match, while, when the character strings completely match, the "similarity factor" always becomes 1.

Figure 8:
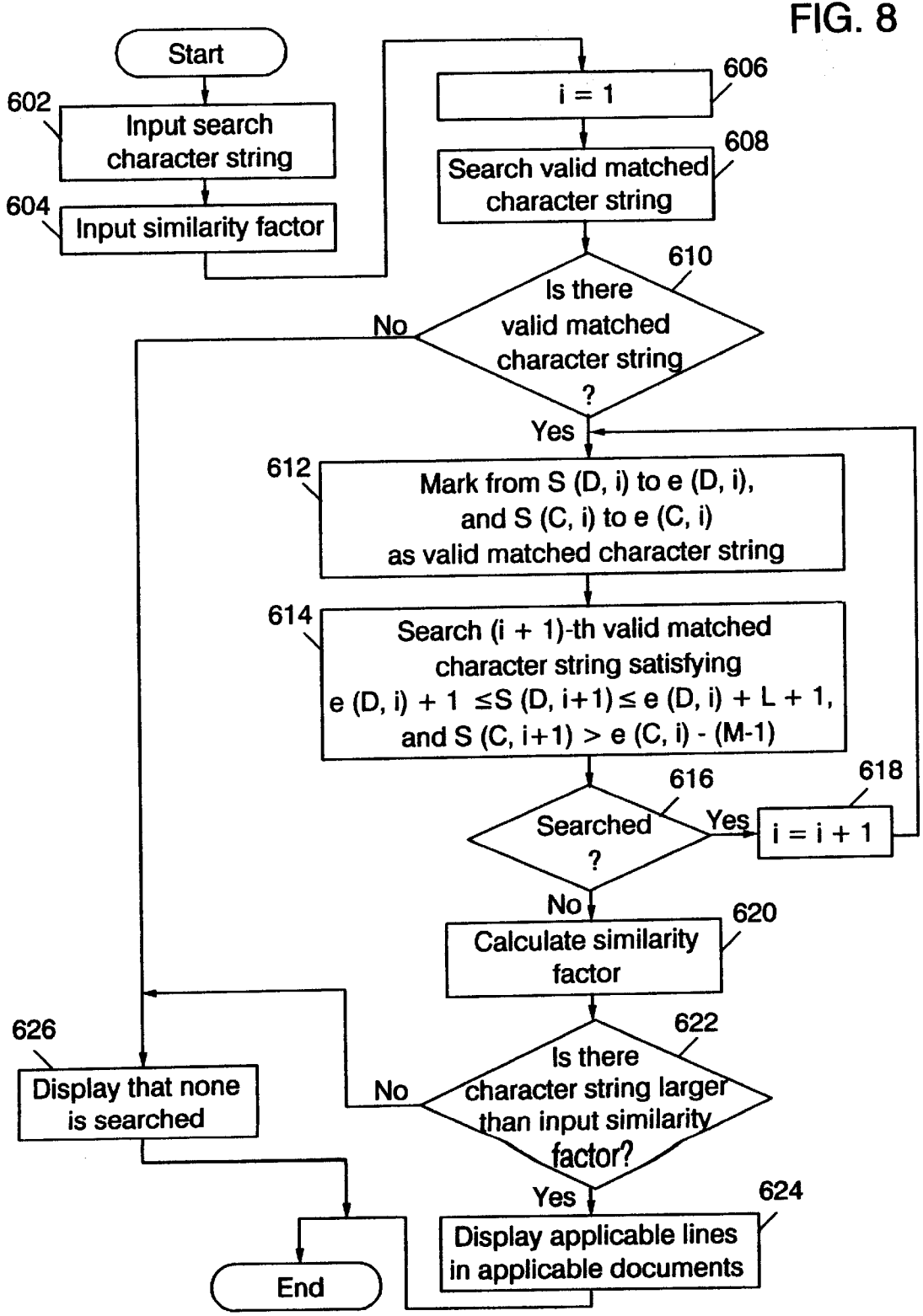
FIG. 8 is a flowchart showing an ambiguity search process using an index file.

The above process is represented as a flowchart shown in FIG. 8. Referring to FIG. 8, first, in step 602, input of a search character string is prompted. Also, in step 604, input of similarity factors of 0–1 is prompted. Usually, input of the character string and the value in steps 602 and 604 is performed by using an input box and a scroll bar of a single dialogue box.

In step 606, the number i for a valid matched character string is set to 1. In step 608, the valid matched character string is searched. Now, if there is a condition that the length of valid matched character string is M characters or more, it is advantageous that an index file of M-character chain is created in the process of FIG. 7. It is because, if such index file previously exists, search for any M-character chain can be performed at a high speed by the dichotomizing search for the index file. Subsequently, search for an M-character chain is performed in the index file by shifting the start position for taking the M-character chain in the index character string by one. Then, if the resulting document number is the same as one previous search for the M-character chain, and the position number in document sequential, a valid matched character string with a length of M+1 would be obtained. Thus, whenever the conditions that the document number is the same as one previous search for the M-character chain and that the position number in document is sequential are satisfied, the length of valid matched character string is incremented by one. However, if nothing is found in the search for M-character chain using the index file, or if the document number being returned does not match, or if the position number in document becomes non-sequential, the end position of valid matched character string would be found.

Sometimes, no valid matched character string is found. In such case, depending on the decision in step 610, the process proceeds to step 626, where it indicates that nothing is found and ends.

When it is determined in step 610 that a valid matched character string is found, the process proceeds to step 612, and s(D,i) to e(D,i) in the document and s(C,i) to e(C,i) in the search character string are marked as the valid matched character string.

In step 614, the (i+1)-th valid matched character string satisfying the conditions a) $e(D,i)+1 \leq s(D,i+1) \leq e(D,i)+L+1$, [Equation 5]

and b) $s(C,i) > e(C,i)-(M-1)$ is searched by also using the index file. If found, the process returns to step 612 where, for the (i+1)-th valid matched character string, s(D,i+1) to e(D,i+1) in the document and s(C,i+1) to e(C,i+1) in the search character string are marked as a valid character string (increment of i in step 618 indicated to pay attention on the next valid matched character string).

On the other hand, if a valid matched character string is not found in step 616 any more, a similarity factor is calculated in step 620. It is given as explained above by, for example, Similarity factor minimum (number of characters in a character string to be searched belonging to a valid matched character string/number of characters of the character string to be searched, number of characters in a "similar character string" belonging to the valid matched character string/number of characters of the "similar character string")÷tm [Equation 6]

In this case, the "similar character string" is a character string from the start position of the first valid matched character string in the document to the last position of the last valid matched character string.

In step 622, results are selected from the similarity factor calculated in step 620 and that input in step 604. Only results with the similarity factor equal to or higher than that input in step 604 are displayed in step 624.

In step 624, a process is performed to access contents of documents stored in the database based on the document numbers and the position numbers in document returned as the result of searches for the index file in steps 608 and 614, and to display lines containing applicable sections.

Although the "similar character string" for one search character string may be simultaneously found in a plurality of documents, it may be found at a plurality of sections even in a single document. Accordingly, it should be noted that steps 606–622 are applied to each of such plurality of "similar character strings", and, in step 624, only those of the plurality of "similar character strings" satisfying the conditions for similarity factor are selected and displayed.

Examples of determination on "similar character string" and similarity factor Examples are given with M=2, and L=3.

Example 1

```
           123456
Character string to be searched C: ABCDEF
           12345678 ...
Document D: AB.CD.EF ...
```

Since the longest character string first matched is "AB," the first valid matched character string is "AB"

$s(C,1)=1\ e(C,1)=2$ $s(D,1)=1\ e(D,1)=2.$

Since $e(C,1)-(M-1)=1$, the second valid matched character string is searched by comparing a character string starting at or after the second character in the character string to be searched with a character string starting at the third, fourth, fifth or sixth character in the document (because $e(D,1)+1=3$, and $e(D, 1)+L+1=6$).

Second valid matched character string "CD"

$s(C,2)=3\ e(C,2)=4$ $s(D,2)=4\ e(D,2)=5$

Since $e(C,1)-(M-1)=3$, the third valid matched character string is searched by comparing a character string starting at and after the fourth character in the character string to be searched with a character string starting at the fifth, sixth, seventh or eighth character in the document (because $e(D, 2)+1=5$, and $e(D,2)+L+1=8$).

Third valid matched character string "EF"

$s(C,3)=5\ e(C,3)=6$ $s(D,3)=7\ e(D,3)=8$

Since the end of the character string to be searched is reached, the third is the last valid matched character string.

[TABLE 5]

<u>AB</u> <u>CD</u> <u>EF</u>
1 2 3
<u>AB</u> · <u>CD</u> · <u>EF</u> ...
1 2 3

Numerals are the number of valid matched character string.

Therefore, the "similar character string" is "AB·CD·EF" from s(D,1) to e(D, 3).

"Similarity factor"=minimum (6/6, 6/8)=6/8=0.75

Example 3

[TABLE 8]

| Character string to be searched C: | 1234<br>ABCD |
|---|---|

[TABLE 9]

| Document D: | 1 2 3 4 5 6 7 8 9 10 11 12 13 14 15<br>A B X X X X C D X X X X X X X. |
|---|---|

Since the longest character string first matched is "AB",

[Equation7]

| First valid matched character string is "AB" | $s\ (C, 1) = 1\ e\ (C, 1) = 2$<br>$s\ (D, 1) = 1\ e\ (D, 1) = 2$ |
|---|---|

The second valid matched character string is searched by comparing a character string starting at the third, fourth, fifth or sixth character in the document (because $e(D,1)+1=3$, and $e(D,1)+L+1=6$) with a character string starting at or after the second character in the character string to be searched (because $e\ (C,1)-(M-1)=1$).

Since the second valid matched character string is not found, and the end of the character string to be searched is reached, the valid matched character string is only the first one.

TABLE 10

<u>AB</u>CD
1
<u>AB</u>XXXXCDXXXXX
X.
1

Therefore, the first "similar character string" is "AB" from s(D,1) to e(D,1).

"Similarity factor"=minimum (2/4, 2/2)=2/4=0.5

The first non-valid matched character after "A" is "X." When the second "similar character string" after "X" is searched:

TABLE 11

AB<u>CD</u>
1
ABXXXX<u>CD</u>XXXXX
X.
1

However, since "AB" and "CD" are separated by four characters in the document, and L=3 in this example, the above "CD" is not considered as a valid matched character string.

Example 4

TABLE 12

123
Character string to be searched C: ABC
123456789
Document D: XABBCXXXX

Since the longest character string first matched is "AB":
[Equation 9 ]

First valid matched character string is "AB"  s (C, 1) = 1 e (C, 1) = 2
                                               s (D, 1) = 2 e (D, 1) = 3

The second valid matched character string is searched by comparing a character string starting at or after the second character in the character string to be searched (because e(C,1)−(M−1)=1) with a character string starting at the fourth, fifth, sixth or seventh character in the document (because e(D,1)+1=4, and e(D,1)+L+1=7).

Second valid matched character string is "BC"  s (C, 2) = 2 e (C, 2) = 3
                                                s (D, 2) = 4 e (D, 2) = 5

Since the end of the character string to be searched is reached, there are two valid matched character strings.

TABLE 13

ABC
1
2
XAB BCXXXX
1   2
1,1,0.5,1−>3.5

The "similar character string" is "ABBC" from s(D,1) to e(D,2). "Similarity factor"=minimum (3/3, 3.5/4)=3.5/4= 0.875

The method for searching a similar character string is described in the above for a case of a search character string consisting of only fixed length chains. When this is extended to a search character string containing variable length chains, it becomes as follows. Here, a variable length chain taken out from the search character string is called an extended search character string.

First, the following extended character chain is obtained by searching for an extended character chain file, and an extended position information file. The searching method is the same as the method for searching a search character string consisting of only fixed length chain from a character chain file and a position information file. M' is used as a one corresponding to the constant M.

(1) Searching a variable length chain matching an extended search character string with a specified search matching factor or higher. In this case, eliminating variable length chains not matching the first character in the extended search character string is effective to reduce noise. In this case, in creating an extended fixed chain, high speed processing can be performed by using "$" indicative of start, creating an extended fixed chain of "$co", and eliminating variable length chains not matching it. However, even when "$" indicative of start is not used, it is possible to identify a start position of a variable length chain from a position number in variable length chain or information on delimiter in the extended position information file.

EXAMPLE

Extended search character string: "communication"
Found variable length chain: "commuication"

(2) Searching a variable length chain matching an extended search character string which is newly created by joining extended search character strings with a specified search matching factor or higher

EXAMPLE

Search character string: "data-base"
Extended search character string: "data", "base"
Extended search character string created by joint: "database"

It may be possible to set the number of joints up to two or three. This process enables it to locate the joined "database" from character strings in a document even in a case of a divided search character string such as "data base".

(3) Searching variable length chains satisfying all the following conditions from variable length chains matching extended search character string with matching factor larger than 0

The first character in variable length chain is included in the matched section.

TABLE 17

[Example] (underline under matched section)

| Extended search character string | | Variable length chain |
|---|---|---|
| "database" | −> o | "data" |
| "database" | −> x | "update" |
| "database" | −> o | "base" |

The first or last character in extended search character string is included in the matched section.

In this case, the process can be performed at a high speed by creating an extended fixed chain of "$co" and "se*¥" through use of "$" indicative of start and "¥" indicative of end in creating the extended fixed chain, and by eliminating variable length chains not matching either of them.

TABLE 18

[Example] (underline under matched section)

| Extended search character string | | Variable length chain |
|---|---|---|
| "database" | −> o | "data" |
| "database" | −> o | "base" |
| "database" | −> x | "tab" |

This process enables it to locate the divided "data" and "base" from character strings in a document even in a case of a joined search character string such as "database". When a variable length chain contains non-matched characters in the number equal to or more than a predetermined number of characters such as when the first character in the extended search character string is included in the matched section (the variable length chain "data" for the extended search character string "database" being applicable to this), or when the last character in the extended search character string is included in the matched section (the variable length chain "base" for the extended search character string "database" being applicable to this), such variable length chain may be excluded from the subject for search. This enables it to increase the search speed by narrowing down the subjects for search.

In the preferred embodiment of the present invention, the variable length chain subject for the processes (1), (2) and (3) described above (that is, (1)+(2)+(3)) becomes the "variable length chain satisfying the conditions" in step 708. However, the conditions may be variously changed to be (1) only, (3) only, (1)+(2) or the like through setting instead of (1)+(2)+(3).

In determining the matching factor for searching an extended index by looking for the variable length chains of (1), (2) and (3), if an evaluation lower than normal matching but higher than normal non-match is given to reversal of characters, it is effective to search a word in which position of characters is reversed, which is often found in a typographical error of an English word.

[Table 19]
[Example of Reversed Characters]

"communication"<->"commnuication"

In this example, a non-matched character string in the search character string is "un", while a non-matched character string in the document character string is "nu". In such case, such non-match caused by typographical error can be detected by determining, for example, whether or not "u" and "n" of the non-matched character string in the search character string are contained in the non-matched character string in the document character string.

The search method for a search character string containing such variable length chain is performed in the procedure shown in FIG. 9. This procedure is described with reference to an embodiment. In this embodiment, search characters are "data communication", and "data . . . communication", "data comminucation", and "daily communication" exist in a document character string. It is assumed that "data" and "communication" in "data . . . communication" are sufficiently separated.

Information on a character chain file and that on a position information file are assumed to be as follows (M'=3):

| Character chain file | Position information file |
|---|---|
| 1. data | 1-1, 2-1 |
| 2. daily | 3-1 |
| 3. comminucation | 2-6 |
| 4. communication | 1-35, 3-7 |

| Extended character chain file | Extended position information file |
|---|---|
| $da | 1-1, 2-1 |
| dat | 1-2 |
| ta¥ | 1-3 |
| a¥ | 1-4 |
| dai | 2-2 |
| ail | 2-3 |
| ily | 2-4 |
| ly¥ | 2-5 |
| y¥ | 2-6 |
| $co | 3-1, 4-1 |
| com | 3-2, 4-2 |
| omm | 3-3, 4-3 |
| mmi | 3-4 |
| min | 3-5 |
| inu | 3-6 |
| nuc | 3-7 |
| uca | 3-8 |
| cat | 3-9, 4-9 |
| ati | 3-10, 4-10 |
| tio | 3-11, 4-11 |
| ion | 3-12, 4-12 |
| on¥ | 3-13, 4-13 |

-continued

| Extended character chain file | Extended position information file |
|---|---|
| n¥ | 3-14, 4-14 |
| mmu | 4-4 |
| mun | 4-5 |
| uni | 4-6 |
| nic | 4-7 |
| ica | 4-8 |

Here, for the purpose of easy understanding, an unsorted file is shown. Here, in "1. data 1-1, 2-1", "1. " indicates the variable length chain number, "data" indicates a variable length chain, and "1-1" and "2-1" indicate "document number—position number in document. " In addition, in "$da 1-1, 2-1", "$da" indicates an extended character chain, and "1-1" and "2-1" indicate "variable length chain number—position in variable length chain". Accordingly, "$da 1-1, 2-1" represents the first character in variable length chain number 1 (data) and the first character in variable length chain number 2 (daily).

When the procedure of FIG. 9 is started, a search character string "data communication" is input (step 702). Then, a similarity factor is input (step 704). It may be possible to set this similarity factor as default, and to omit its input. Here, a similarity factor 0.80 is input.

Then, a fixed length chain and a variable length search character string are created from the search character string (step 706). In this example, since the description is made on a document consisting of only delimiter language, there is no fixed length chain.

Variable length chains satisfying the conditions are searched from the extended character chain file and the extended position information file (step 708). Here, a process is performed for searching variable length chains of above (1), (2) and (3). That is, (1) search is performed for a variable length chain matching an extended search character string with a specified search matching factor or higher. While the search matching factor in this case may be set to the same value as similarity factor for the entire character string, it is preferable to be lower than the similarity factor for the entire document. For example, since "communication" and "comminucation" match for 10 characters in 13 characters, and three characters do not match, the similarity factor is 10/13=0.77 in a simple calculation method of similarity factor (here, for easy understanding by the reader, description is made by using the simple calculation method of similarity factor). The similarity factor between "data communication" and "data comminucation" is 15/18=0.83 in the simple calculation method of similarity because they match for 15 characters in 18 characters including delimiter, and three characters do not match. Thus, there are many cases where the similarity factor for entire character string becomes higher even if the similarity factor between the variable length chains is low, and this tendency becomes more significant when the character string becomes longer.

In this embodiment, the "specified search matching factor" is set to 0.60 for "data" and 0.72 for "communication". The "specified search matching factor" may be changed depending on the ratio of the number of characters in the search character string to that in the variable length chain. This is because, as shown in this example, while the similarity factor for entire character string does not become 0.80 or higher unless the variable length chain matches "communication" for 10 characters or more, there is a possibility that, for "data", the similarity factor for entire character string becomes 0.80 or higher even if only one character matches. However, if too low matching factor is allowed for "data", the number of matched variable length chains increases and the search speed is affected so that 0.6 is set as the lower limit. In addition, in the preferred embodiment of the present invention, variable length chains not seriously affecting on the similarity factor for entire document are excluded from the subject for variable length chain searching of (1). This enables it to improve the search speed.

In the embodiment, high speed search is made possible by excluding variable length chains which have number of characters less than the similarity factor x number of characters of variable length chain to be searched (=0.72×13=9.36) from the subject for search. This is attained by controlling the number of characters of variable length chain, for example, as follows:

| Extended character chain file | Extended position information file |
| --- | --- |
| $da | 1-1-4, 2-1-5. |

"1-1-4" and "2-1-5" in $da 1-1-4, 2-1-5 indicate "variable length chain number—position in variable length chain—number of characters in variable length chain".

As variable length chains having the search matching factor of 0.60 or higher for "data" and 0.72 or higher for "communication", "data" (100%) can be found for "data", and "comminucation" (77%) and "communication" (100%) can be found for "communication" by a method similar to that for fixed length chain.

In the case of a search character string "communication", for example, chains matching a corresponding extended search character string are the following in the extended character chains:

| Extended character chain file | Extended position information file |
| --- | --- |
| $co | 3-1, 4-1 |
| com | 3-2, 4-2 |
| omm | 3-3, 4-3 |
| mmi | 3-4 |
| min | 3-5 |
| inu | 3-6 |
| nuc | 3-7 |
| uca | 3-8 |
| cat | 3-9, 4-9 |
| ati | 3-10, 4-10 |
| tio | 3-11, 4-11 |
| ion | 3-12, 4-12 |
| on¥ | 3-13, 4-13 |
| n¥ | 3-14, 4-14 |

Then, "3. comminucation" and "4. communication" in the character chain file can be found from the information on the extended position information file.

Then, (2) search is performed for a variable length chain matching an extended search character string which is newly created by joining extended search character strings with a specified search matching factor or higher. Therefore, variable length chains matching the search character string "datacommunication" with a specified search matching factor or higher are searched. In this case, while the "specified search matching factor" may be set to the same value as the similarity factor for entire character string, it may be lower than the similarity factor for entire document. For example, although, when the search character string is "data base system", there exist three extended search character strings created by joint of "database", "basesystem" and "databasesystem", impact of these joined search character strings on the similarity factor for entire document varies depending on the number of characters in the joined search character strings. In the embodiment, because the "specified search matching factor" of (2) is set to 0.80, there is no variable length chain matching the search character string "datacommunication" with the specified search matching factor or higher.

Then, variable length chains satisfying all conditions of "1. the first character of variable length chain is contained in the matched section", and "2. the first or last character of extended search character string is contained in the matched section" are searched in (3) variable length chains matching the extended search character string with the matching factor of 0 or higher. The variable length chains meeting these conditions are "data", "comminucation" and "communication" as in (1).

Referring to FIG. 9 again, in step 710, it is determined whether or not a variable length chain is found. In the embodiment, "1. data", "3. comminucation"and "4. communication" have been found. Numbers of these variable length chains are stored in a buffer (step 712). In the embodiment, the variable length chain numbers 1, 3, and 4 are stored. In the preferred embodiment of the present invention, the variable length chain character strings "data" and "communication" of the search character string "data communication" are assigned a number (variable length chain search character string number), respectively. The variable length chain numbers 1, 3 and 4 are stored in connection with such numbers. Therefore, the information being stored is (1-1) and (2-3, 4). This (2-3, 4) indicates the variable length chain numbers 3 and 4 of the variable length chains in the document matching the variable length chain search character string number 2 with a certain matching factor or higher.

Then, in step 714, the similarity factor for the entire character string is calculated from the positional relationship between the position information of fixed length chain and the position information of variable length chain. Specifically, as described above, the variable length chain numbers 1, 3 and 4 in the document are stored for the variable length chain search character string number. Therefore, the variable length chains in document which may be joined are 1-3 and 1-4 ("1." corresponds to "data", "3." to "comminucation", and "4." to "communication").

Since, when the contents of the character chain file 302 and the position information file 304 are referenced,

| Character chain file | Position information file |
| --- | --- |
| 1. data | 1-1, 2-1 |
| 3. comminucation | 2-6 |
| 4. communication | 1-35, 3-7, | combinations of (1-1, 2-1)–(2-6), and (1-1, 2-1)–(1-35, 3-7), that is, combinations of (1-1)–(2-6),
(2-1)–(2-6),
(1-1)–(1-35),
(1-1)–(3-7),
(2-1)–(1-35), and
(2-1)–(3-7)

become candidates.

However, cases where 1. document numbers are different, where 2. condition L=3 is not satisfied, and where 3. position numbers in document are reversed are excluded from the candidates for the calculation of similarity factor. The combination of variable length chains with such conditions is only (2-1)–(2-6). Therefore, "data comminucation" is calculated for the similarity factor. However, the conditions where "2. condition L=3 is not satisfied", and where "3. position numbers in document are reversed" are employed for a case where order is important as in "data comminucation", but are not employed for a case where order is not important as in searching for character strings which are extraction of keywords (variable length chains) in the abstract from a patent specification.

In the above description, in step 712, the variable length chain numbers are stored in connection with the variable length chain search character string numbers. However, storing the variable length chain search character string numbers is not an essential component of the present invention. Combinations of variable length chains can be determined without information on the variable length chain search character string numbers.

This is specifically described. The contents of the character chain file 302 and the position information file 304 are referenced from the stored variable length chain numbers in step 712.

| Character chain file | Position information file |
|---|---|
| 1. data | 1-1, 2-1 |
| 3. comminucation | 2-6 |
| 4. communication | 1-35, 3-7 |

The character chain file is divided according to the contents of the position information file.

| Character chain file | Position information file |
|---|---|
| 1. data | 1-1 |
| 1. data | 2-1 |
| 3. comminucation | 2-6 |
| 4. communication | 1-35 |
| 4. communication | 3-7 |

Then, the character chain file is sorted according to the contents of the position information file.

| Character chain file | Position information file |
|---|---|
| 1. data | 1-1 |
| 4. communication | 1-35 |
| 1. data | 2-1 |
| 3. comminucation | 2-6 |
| 4. communication | 3-7 |

If L=3, it is found that, in view of the contents of the position information file, 1. data 1-1,
4. communication 1-35, and
4. communication 3-7 have no other variable length chain to be combined.
On the other hand, because 1. data 2-1, and
3. comminucation 2-6 satisfy the condition L=3, they are combined and determined for the similarity factor.

Therefore, the candidates for the calculation of similarity factor are:

1. data 1-1,
4. communication 1-35,
4. communication 3-7, and
1-3. data comminucation 2-1

To prevent duplicated calculation of similarity factor, they are arranged by the variable length chain number.

1. data 1-1
4. communication 1-35, 3-7
1-3. data comminucation 2-1

Then, character strings less than search character string (18: including delimiter) x similarity factor (0.80) (character strings less than 14.4) are excluded from the subject for calculation of similarity factor (in practice, it is desirable to perform before they are arranged by the variable length chain number). Accordingly, the candidates for the calculation of similarity factor become only 1-3. data comminucation 2-1.

Since the search character string "data communication" matches "data comminucation" for 15 characters of 18 characters, and three characters do not match, the similarity factor between them is calculated as 0.83.

The calculation of similarity factor for character string in step 714 can be reduced by storing the similarity factor of variable length chain together with the variable length chain numbers in step 712. That is, (1-1.00), (3-0.77) and (4-1.00) are stored in step 712 and utilized.

In the simple calculation method of similarity factor, the similarity factor is possible to be calculated from the following equation.

Similarity factor=(number of characters in variable length chain 1×matching factor of variable length chain 1+number of characters in variable length chain 2×matching factor of variable length chain 2+ . . . +number of characters of delimiter)/(number of characters in search character string)    [Equation 9]

Accordingly, the similarity factor of the embodiment is (4×1.00+13×0.77+)/18=0.83. Whether or not the the delimiter is counted as one character may be changed by the design.

Then, in step 716, the input similarity factor is compared to the calculated similarity factor. If there exists no character string with similarity factor higher than the input similarity factor, a display indicating that none is found is displayed on the display 110 (step 720). If it is found, applicable line(s) in applicable document(s) is displayed (step 718). However, the display indicating that none is found and the display of applicable line(s) in applicable documents are not essential component, and these information may be transmitted to another computer (including a client). In addition, the display of applicable line(s) in applicable document(s) may display all character strings with the input similarity factor or higher together with their similarity factor, document numbers, position numbers in document and the like, or to display only predetermined numerals. The order of display may be the sequence of appearance in the document(s) or in the descending order of similarity factor. Moreover, in case of multiple documents, it may be possible to display predetermined numerals for character strings satisfying conditions in each document. They can be set variously in the design stage.

While an approach has been described for use in the ambiguity search for document, the present invention may be applied to spelling checking of words in a document. In this case, first, a word in the document not existing in a dictionary is detected by the conventional approach. Then, the detected word not existing in the dictionary is used as a search character string, and the ambiguity search is performed for words existing in the dictionary. Then, words with a certain similarity factor or higher in the ambiguity search are displayed as candidates with correct spelling for the word not existing in the dictionary.

Search for character strings consisting of only variable length chains has been described in the above. For a document in which variable length chains and fixed length chains are intermixed, the similarity factor for entire character string is calculated in step 714 from the positional relationship between the position information for fixed length chain and the position information for variable length chain. This process is described by exemplifying an embodiment. In the embodiment, there exists a search character string "ASEAN123" and "ASEA012" exists in the document. "ASEAN" and "ASEA" are variable length chains.

In such case, the contents of the character chain file 302 and the position information file 304 are:

| Character chain file | Position information file |
|---|---|
| 1. ASEA | 1-1 |
| 2. 01 | 1-5 |
| 3. 12 | 1-6 |

A variable length chain document character string "ASEA" similar to the variable length chain search character string "ASEAN" has been found by the above-mentioned method. For this character string, detection of a valid matched character string and calculation of similarity factor are performed in a similar manner to the method described for fixed length chain.

EXAMPLE

TABLE 20

| Character string to be searched C: | 12345678 |
|---|---|
| | ASEAN123 |
| Document D: | 1234567 |
| | ASEA012 |

TABLE 21

| ASEAN123 |
|---|
| 1 2 |
| ASEA012 |
| 1 2 |

Similar character string="ASEA012"

Similarity factor=minimum (6/8, 6/7)=0.75

As described for the calculation of similarity factor for a character string containing only variable length chains, in the calculation of similarity factor, the result of calculation of similarity factor for variable length chain may be used for the calculation of similarity factor for entire character string. In the simple calculation of similarity factor, the similarity factor becomes possible to be calculated from the following equation.

Similarity factor=(number of characters in variable length chain 1×matching factor of variable length chain 1+number of characters in valid matched character string of fixed length chain+number of characters of delimiter)/number of characters in search character string [Equation 10]

Accordingly, the similarity factor of the search character string in the embodiment is (5×0.80+2+0)/8=0.75, and the similarity factor of the document character string is (4×0.80+2+0)/7=0.74. Thus, the similarity factor of the search character string is:

Similarity factor=minimum (0.75, 0.74)=0.74

In this calculation of similarity factor, the calculation may be performed by changing weight for the variable length chain and the fixed length chain. For example, Similarity factor=(number of characters in variable length chain 1×matching factor of variable length chain 1×0.5+number of characters in valid matched character string of fixed length chain+number of characters of delimiter×0.2)/(number of characters in search character string×0.5+number of characters in fixed length chain in search character string+ number of characters of delimiter in search character string× 0.2)+tm [Equation 11]

The above-mentioned search is a one for an example of fixed character string. A case where it is applied to a search equation is described. For example, in a search equation such as (computer OR system) AND communication (a search equation searching for a document containing "computer" or "system", and containing "communication"), it is conceived to perform ambiguity search by specifying a search matching factor for each search character string. When the search is performed for every search character string with the matching factor of 80% or higher, for example, the following documents may be found:

a document containing "conputer" and "comnication", and a document containing "sys-tem" and "communication"

In addition, when the found documents are arranged in descending order of possibility close to the one to be located, it is possible to use the matching factor obtained as the result of search as a cue.

Ambiguity search for a "similar character string" can be attained at a considerably high speed with the structure of index according to the present invention by suitably determining the value of M.

Determination of Constants N and M

[Table 22]

N: Number of characters in character chain to be stored in index

M: Shortest length of valid matched character string in ambiguity search

L: Longest length of non-valid matched character string in "similar character string" in ambiguity search Although, if the values of N and N' are increased, the number of types of character chains increases, volume of data decreases per one character chain, and the search can be performed at a higher speed, the capacity of index file increases. Sufficient search speed is obtained at N=2 and N'=3 for average documents in Japanese, Chinese, Korean, and English.

In addition, if M and M' are determined to be M≧N and M'≧N', sufficient search speed is obtained in the ambiguity search. In view of the fact that the smaller M and M' are, the finer search can be attained, it is believed to be desirable to set M=N and M'=N'.

The ambiguity search of the second embodiment is particularly considered for equilibrium between "the more number of non-matched characters is inserted, the less similarity one feels" and "too much non-matched characters are inserted, then it cannot be felt to be one character string". When a character string matching an input character string, a non-matched character string and a matched character string are arranged in a document, it is unnatural that degree of similarity is lowered when the character strings up to the latter matched character string are taken as a similar character string. For example, such a rule is against human sensation that, when the input character string is "ABCD", the document 1 contains "ABXXXCD", and the document 2 contains "AB", "ABXXXCD" is a similar character string in the document 1, "AB" is that in the document 2, and the degree of similarity is higher for "AB". It is unnatural that since the document 1 contains an additional matched character string of "CD", it is evaluated to have a lower degree. It is natural that either the degree of similarity for "ABXXXCD" is higher than "AB", or similar character strings in the document 1 are two of "AB" and "CD".

Now, the process of the second embodiment is described. Referring to the flowchart of FIG. 8, in this embodiment, steps 602–612 are same as before, and the process for step 614 for indicating the conditions in searching the (i+1)-th valid matched character string is changed as follows:

[Equation 12]

$$s(C,i+1) > e(C,i)-(M-1) \quad \text{(Equation 1)}$$

$$s(D,i+1) > e(D,i) \quad \text{(Equation 2)}$$

and $$s(D,i+1)-e(D,i)-1+\max(e(C,i)-s(C,i+1)+1, 0) \leq L \quad \text{(Equation 3)}$$

Definition of $s(C,i)$, $e(C,i)$, $s(D,i)$, $s(D,i)$ and the like is the same as above.

Equation 1 means that duplicatively appeared characters are allowed up to $M-1$ characters, otherwise character strings appearing in the same order as that of characters in the input character string are made valid.

Equation 2 means that valid matched character strings are not overlapped each other in the document.

Equation 3 means that inserted non-matched characters and duplicatively appeared characters are allowed up to L characters together.

In this embodiment, instead of calculating the ratio of valid matched character strings occupying each of the search character string and similar character strings in the document, and selecting the smaller one as the similarity factor as in the previous embodiment, the similarity factor is calculated by giving marks to similar character strings and dividing them, with the full mark (mark when it is completely matched). The mark for similar character string is calculated by giving a mark to each character under the following rule, and adding them. Accordingly, the process in step 620 of FIG. 8 becomes as follows:

| | |
|---|---|
| Character belonging to the first valid matched character string | ... 1 point |
| Character belonging to the i-th (i > 1) valid matched character string, and position in search character string ≠ e (C, i-1) + 1 (Equation 4) | ... 1 point |
| position in search character string = ... e (C, i-1) (Equation 5) | ... -1/(2* L) point |
| Character not belonging to valid matched character string | ... -1/L point |

Also in this embodiment, when the i-th similar character string has been determined, the (i+1)-th similar character string is determined by starting comparison from the first character after the top character in the i-th similar character string and not belonging to the valid matched character strings constituting the i-th similar character string.

The negative point for the character not belonging to the valid matched character string is set by taking into account the equilibrium between "the more number of non-matched characters is inserted, the less similarity one feels" and "too much non-matched characters are inserted, then it cannot be felt to be one character string". The maximum total of negative points for one non-matched character string is $1/L*L=1$, and the minimum positive point is $N \geq 1$ when taking in the next matched character string (2 is particularly recommended for Japanese). Thus, the negative points never exceed the positive points. In addition, Equation 5 indicates a duplicatively appeared character, while Equation 4 indicates a simple matched character not a duplicatively appeared character. A case where a character duplicatively appears is accommodated by giving to a character expressed by Equation 5 a negative mark smaller than that for a simple non-matched character.

Example of Determination of Similar Character String and Degree of Similarity in the Second Embodiment An example is shown also for N=2, and L=3.

TABLE 23

| [Example 5] | |
|---|---|
| Input character string C: | 123456 |
| | ABCDEF |
| Part of document D: ... | 12345678 |
| | AB · CD · EF ... |

Since the first matched character string is "AB", the first valid matched character string is "AB".

$$s(C,1)=1 \ e(C,1)=2 \quad \text{[Equation 13]}$$

$$s(D,1)=1 \ e(D,1)=2$$

According to Equations 1, 2 and 3, the second valid matched character string is "CD".

$$s(C,2)=3 \ e(C,2)=4 \quad \text{[Equation 14]}$$

$$s(D,2)=4 \ e(D,2)=5$$

According to Equations 1, 2 and 3, the third valid matched character string is "EF".

$$s(C,3)=5 \ e(C,3)=6 \quad \text{[Equation 15]}$$

$$s(D,3)=7 \ e(D,3)=8$$

Since the end of the input character string is reached, the valid matched character strings are three.

TABLE 24

| | |
|---|---|
| C: | AB CD EF |
| | 1 2 3 |
| D: | AB · CD · EF |
| | 1 2 3 |
| Points | 1,1, 1,1, 1,1, |
| | -1/3 -1/3 |

The similar character string is "AB·CD·EF" from s(D,1) to e(D,3). The degree of similarity=((1*6+(-1/3)*2)/6)=0.88

TABLE 27

[Example 7]

| | |
|---|---|
| Input character string C: | 1234 |
| | ABCD |
| Part of document D: . . . | 12345678910111121314 |
| | ABXXXXCDXXXXXX . . . |

Since the first matched character string is "AB", the first valid matched character string is "AB". Since the next matched character string "CD" fails to satisfy Equation 3, the valid matched character string is only the first one.

TABLE 28

C: ABCD
 1
D: ABXXXXCDXXXXXX.
 1

The similar character string is "AB." The degree of similarity=2/4=0.5
The first non-valid matched character after "A" is "X". The second similar character string is searched after "X".

[TABLE 29]

C: AB<u>CD</u>
 1
D: ABXXXX<u>CD</u>XXXXXX.
 1

Thus, the second similar character string is "CD".

[TABLE 30]

[Example 8]
 1234567
Input character string C: ABCDEFG
 12345678
Part of document D: . . . ABCCDEFG . . .

The valid matched character strings are two of "ABC" and "CDEFG".

[TABLE 31]

C: ABCDEFG
  1___
  2
D: ABC  CDEFG
  1   2
  1,1,1, 1,1,1,1
  –1/6

The similar character string is "ABCCDEFG," and the second "C" satisfies Equation 5. Thus, the degree of similarity=$((1*7+(-1/6)*1)/7)=0.97$.

While the ambiguity search according to the second one of the preferred embodiments of the present invention has been described for the calculation of similarity factor for fixed length chains, it will be easily understood by those skilled in the art that it can be applied to a character string containing variable length chains.

As described above, according to the present invention, an advantage is obtained that ambiguity search natural to the human sensation can be attained at a high speed for a document file or database by using a unique index structure. In addition, it is possible to attain an advantage that search can be performed at a high speed for a database consisting of documents described by one or mixture of a plurality of languages such as Japanese, Korean, Chinese, and English with a single index structure and a single algorithm.

In the drawings and specifications there has been set forth a preferred embodiment of the invention and, although specific terms are used, the description thus given uses terminology in a generic and descriptive sense only and not for purposes of limitation.

What is claimed is:

1. A method for searching a document character string which contains a variable length chain document character string, and which is similar to a search character string at a predetermined similarity factor or higher of character string, said search character string containing a variable length chain search character string, in a document searchably stored through computer processing, the method comprising the steps of:

(a) associating document character string identifying information for identifying a document character string in which said variable length chain document character string exists and document character string position information for indicating the position in the document character string at which said variable length chain document character string exists with the variable length chain document character string;

(b) extracting and storing a partial document character string of a length of M characters (M being a predetermined integer of one or more) from said variable length chain document character string;

(c) associating variable length chain document character string identifying information for identifying a variable length chain document character string in which said partial document character string exists and variable length chain document character string position information for indicating the position in the variable length chain document character string at which said partial document character string exists with said partial document character string;

(d) searching a partial document character string which matches a partial search character string of a length of N characters (N being a predetermined integer of one or more) extracted from said variable length chain search character string;

(e) searching a partial document character string which matches a partial search character string of a length of N characters in the variable length chain search character string but having a start position shifted by one;

(f) identifying a set of partial document character strings matching the partial search character string in said variable length chain search character string by repeating said step (e);

(g) identifying candidates of variable length chain document character strings which have possibility of matching said variable length chain search character string at the predetermined matching factor or higher of variable length chain from variable length chain document character string identifying information and variable length chain document character string position information for a partial character string belonging to said set of partial document character strings;

(h) calculating a matching factor of variable length chain between said variable length chain search character string and said variable length chain document character string candidates;

(i) selecting a variable length chain document character string with a matching factor of variable length chain equal to or higher than a predetermined matching factor of variable length chain with the variable length chain search character string from said variable length chain document character string candidates;

(j) identifying a document character string in which said selected variable length chain document character string exists from the document character string identifying information for said selected variable length chain document character string;

(k) calculating a character string similarity factor between the document character string in which the selected variable length chain document character string exists and the search character string containing the variable length chain search character string; and (l) when said calculated character string similarity factor is equal to or higher than the predetermined similarity factor of character string, displaying said identified variable length chain document character string.

2. A method for searching a document character string which contains a variable length chain document character string, and which is similar to a search character string, said search character string containing a variable length chain search character string, in a document searchably stored through computer processing, the method comprising the steps of:

(a) associating said variable length chain document character string with document character string identifying information for identifying a document character string in which said variable length chain document character string exists;

(b) associating, from said variable length chain document character string, a partial document character string of a length of M characters (M being a predetermined integer of one or more) with variable length chain document character string identifying information for identifying a variable length chain document character string in which said partial document character string exists;

(c) searching a partial document character string which matches a partial search character string of a length of N characters (N being a predetermined integer of one or more) extracted from said variable length chain search character string;

(d) identifying from variable length chain document character string identifying information for a partial document character string which matches said partial search character string a variable length chain document character string relating to the partial document character string which matches said partial search character string; and (e) identifying from document character string identifying information for the identified variable length chain document character string a document character string in which the identified variable length chain document character string exists.

3. A method for searching a document character string which contains a variable length chain document character string, and which is similar to a search character string, said search character string containing a variable length chain search character string, in a document searchably stored through computer processing, the method comprising the steps of:

(a) searching a partial document character string matching a partial search character string of a length of N characters (N being a predetermined integer of one or more) extracted from said variable length chain search character string in an index file in which said variable length chain document character string is associated with document character string identifying information for identifying a document character string in which said variable length chain document character string exists, and associated with variable length chain document character string identifying information which identifies a partial document character string of a length M characters (M being a predetermined integer of one or more) and a variable length chain document character string in which the partial document character string exists from the variable length chain document character string;

(b) identifying, from variable length chain document character string identifying information for the partial document character string matching said partial search character string, a variable length chain document character string relating to the partial document character string matching said partial search character string; and (c) identifying, from the document character string identifying information for said identified variable length chain document character string, a document character string in which the identified variable length chain document character string exists.

4. A method for searching a document character string which contains a variable length chain document character string, and which is similar to a search character string at a predetermined similarity factor or higher, said search character string containing a variable length chain search character string, in a document searchably stored through computer processing, the method comprising the steps of:

(a) associating document character string identifying information for identifying a document character string in which said variable length chain document character string exists and document character string position information for indicating the position in the document character string at which said variable length chain document character string exists with said variable length chain document character string;

(b) extracting and storing a partial document character string of a length of M characters (M being a predetermined integer of one or more) from said variable length chain document character string;

(c) associating variable length chain document character string identifying information for identifying a variable length chain document character string in which said partial document character string exists and variable length chain document character string position information for indicating the position in the variable length chain document character string at which said partial document character string exists with the partial document character string;

(d) searching a partial document character string which matches a partial search character string of a length of N characters (N being a predetermined integer of one or more) extracted from said variable length chain search character string;

(e) searching a partial document character string which matches a partial search character string of a length of N characters in said variable length chain search character string but having a start position shifted by one;

(f) identifying a set of partial document character strings matching the partial search character string in said variable length chain search character string by repeating the step (e);

(g) identifying variable length chain document character strings which are similar to said variable length chain search character string from variable length chain document character string identifying information and variable length chain document character string position information for a partial character string belonging to said set of partial document character strings; and (h) identifying, from the document character string identifying information for said identified variable length chain document character string, a document character string in which the identified variable length chain document character string exists.

5. A method for creating a file for search by the computer from a document containing a plurality of variable length chains in a storage device accessible by a computer, the method comprising the steps of:

(a) extracting a first variable length chain from said document;

(b) storing information for the position in said document at which said first variable length chain appears;

(c) extracting a first extended fixed length chain from said first variable length chain; and (d) storing information for identifying said first variable length chain in which said first extended fixed length chain exists and information for the position in said first variable length chain at which said first extended fixed length chain exists.

6. A method for creating a file for search by the computer from a document containing a plurality of variable length chains in a storage device accessible by a computer, the method comprising the steps of:

(a) extracting a plurality of variable length chains from said document and storing them in a character chain file;

(b) storing in a position information file information for the positions in said document at which said plurality of variable length chains appear;

(c) extracting extended fixed length chains of a length of M characters (M being a predetermined integer of one or more) from each of said plurality of variable length chains and storing them in an extended character chain file; and (d) storing in an extended position information file information for identifying said variable length chains in which said extended fixed length chains exist and information for the position in said variable length chains in which said extended fixed length chains exist.

7. A method for calculating with a computer the similarity factor between a first character string containing a first variable length chain and a second character string containing a second variable length chain, the method comprising the steps of:

(a) searching said first variable length chain character string for a partial character string of a length of N characters (N being a predetermined integer of one or more) which matches in said second variable length chain;

(b) searching a partial character string of a length of N characters which is a partial character string in said first variable length chain with the start position shifted by one for a partial character string which matches in said second variable length chain;

(c) deriving variable length chain matching character identifying information for identifying characters matching said first variable length chain in said second variable length chain by repeating the step (b);

(d) calculating a variable length chain matching factor between said first variable length chain and said second variable length chain based on the variable length chain matching character identifying information and the number of characters in the first variable length chain; and (e) calculating the similarity factor of the first character string based on the variable length chain matching factor.

8. A method for calculating with a computer the similarity factor between a first character string containing a first variable length chain and a second character string containing a second variable length chain, the method comprising the steps of:

(a) associating character string identifying information for identifying a second character string in which said second variable length chain character string exists and character string position information for indicating the position in the second character string at which said second variable length chain character string exists with said second variable length chain character string;

(b) extracting and storing a first partial character string of a length of M characters (M being a predetermined integer of one or more) from said second variable length chain character string;

(c) associating variable length chain character string identifying information for identifying the second variable length chain character string in which said first partial character string exists and variable length chain character string position information for indicating the position in the second variable length chain character string at which said first partial character string exists with the second partial document character string;

(d) searching a second partial character string which matches the first partial character string of a length of N characters (N being a predetermined integer of one or more) extracted from said first variable length chain character string;

(e) searching a second partial character string matching the first partial search character string of a length of N characters which is a first partial character string in said first variable length chain character string with the start position shifted by one;

(f) identifying a set of the second partial character strings matching the first partial character string in said first variable length chain character string by repeating the step (e);

(g) identifying candidates of variable length chain character strings which have possibility of matching said first variable length chain character string at the predetermined matching factor or more of variable length chain from variable length chain character string identifying information and variable length chain character string position information for a second partial character string belonging to said set of second partial character strings;

(h) calculating a matching factor of variable length chain between said first variable length chain character string and said variable length chain character string candidates;

(i) selecting a second variable length chain character string with a matching factor of variable length chain equal to or higher than a predetermined matching factor of variable length chain with said first variable length chain character string from said variable length chain character string candidates;

(j) storing the matching factor of variable length chain for said selected second variable length chain character string;

(k) identifying from character string identifying information for said selected second variable length chain character string a second document character string in which said selected second variable length chain character string exists; and (l) calculating the character string similarity factor between said second character string in which said selected second variable length chain character string exists and said search character string containing said first variable length chain search character string based on said stored variable length chain matching factor.

9. A method for searching a position where a document character string similar to a search character string with a predetermined similarity factor or higher appears, the search character string containing a variable length chain search character string in a document including variable length chain document character string, searchably stored through computer processing, the method comprising the steps of:

(a) locating the start and end positions of match in said variable length chain document character string for a partial character string of a length of M characters (M being a predetermined integer of one or more) from the top of said variable length chain search character string (hereinafter the partial character string of a length of M characters determined by the start and end positions being referred to a "valid matched character string");

(b) locating the (i+i)-th valid matched character string satisfying the following conditions:

$$e(D, i)+1 \leq s(D, i+1) \leq e(D, i)+L+1,$$

and $$s(C, i+1) > e(C, i)-(M-1)$$

where s(D, i) is the start position of the i-th valid matched character string in the document;

e(D, i) is the end position of the i-th valid matched character string in the document;

s(C, i) is the start position of the i-th valid matched character string in a character string to be searched;

e(C, i) is the end position of the i-th valid matched character string in a character string to be searched; and L is a predetermined integer of one or more;

(c) continuing the step (b) as long as said valid matched character strings can be located;

(d) calculating a similarity factor between said variable length chain search character string and a character string which exists between the start position of the first valid matched character string in said variable length chain document character string and the end position of the last valid matched character string in said variable length chain document character string based on information on existence of valid matched character strings in a character string at least between the start position of the first valid matched character string in said variable length chain document character string and the end position of the last valid matched character string in said variable length chain document character string;

(e) identifying a variable length document character string in response to the fact that said calculated similarity factor is equal to or higher than a predetermined similarity factor; and (f) identifying a document character string containing said identified variable length chain document character string.

10. An apparatus for searching a document character string which contains a variable length chain document character string, and which is similar to a search character string at a predetermined similarity factor or higher of character string, said search character string containing a variable length chain search character string, in a document searchably stored through computer processing, the apparatus comprising:

(a) an input device for inputting said search character string;

(b) a storage device for storing:

(b1) a character chain file for storing said variable length chain document character string;

(b2) a position information file for storing document character string identifying information for identifying a document character string in which said variable length chain document character string exists, and document character string position information for indicating the position in the document character string at which the variable length chain document character string exists;

(b3) an extended character chain file for storing a partial document character string of a length of M characters (M being a predetermined integer of one or more) extracted from said variable length chain document character string; and (b4) variable length chain document character string identifying information for identifying a variable length chain document character string in which said partial document character string exists, and an extended position information file for storing variable length chain document character string position information indicating the position in the variable length chain document character string at which said partial document character string exists;

(c) control means for performing:

(c1) search of a partial document character string matching a partial search character string of a length of N characters (N being a predetermined integer of one or more) extracted from said variable length chain search character string;

(c2) search of a partial document character string matching a partial search character string of a length of N characters in said variable length chain search character string but having a start position shifted by one;

(c3) identification of a set of partial document character strings matching the partial search character string in said variable length chain search character string by repeating the step (c2);

(c4) identification of candidates of variable length chain document character strings which have possibility of matching said variable length chain search character string at the predetermined matching factor or higher of variable length chain from variable length chain document character string identifying information and variable length chain document character string position information for a partial character string belonging to the set of partial document character strings;

(c5) calculation of a variable length chain matching factor between said variable length chain search character string and said variable length chain document character string candidates;

(c6) selection of variable length chain document character strings having a variable length chain matching factor equal to or higher than a predetermined variable length chain matching factor with said variable length chain search character string from said variable length chain document character string candidates, (c7) identification of a document character string in which said selected variable length chain document character string exists from said document character string identifying information for the selected variable length chain document character strings; and (c8) calculation of a character string similarity factor between a document character string in which said selected variable length chain document character string exists and the search character string containing said variable length chain search character string; and (d) a display device for displaying the identified variable length chain document character string when said calculated character string similarity factor is equal to or higher than said predetermined similarity factor of character string.

11. An apparatus for searching a document character string which contains a variable length chain document character string, and which is similar to a search character string, said search character string containing a variable length chain search character string, in a document searchably stored through computer processing, the apparatus comprising:

(a) means for associating said variable length chain document character string with document character string identifying information for identifying a document character string in which said variable length chain document character string exists;

(b) means for associating a partial document character string of a length of M characters (M being a predetermined integer of one or more) from said variable length chain document character string with variable length chain document character string identifying information for identifying a variable length chain document character string in which said partial document character string exists;

(c) means for searching a partial document character string matching a partial search character string of a length of N characters (N being a predetermined integer of one or more) extracted from said variable length chain search character string;

(d) means for identifying a variable length chain document character string relating to the partial document character string matching said partial search character string from the variable length chain document character string identifying information for the partial document character string matching said partial search character string; and (e) means for identifying a document character string in which said identified variable length chain document character string exists from document character string identifying information for said identified variable length chain document character string.

12. An apparatus for searching a document character string which contains a variable length chain document character string, and which is similar to a search character string, said search character string containing a variable length chain search character string, in a document searchably stored through computer processing, the apparatus comprising:

(a) means for searching a partial document character string matching a partial search character string of a length of N characters (N being a predetermined integer of one or more) extracted from said variable length chain search character string in an index file, in which index file said variable length chain document character string is associated with document character string identifying information for identifying a document character string in which said variable length chain document character string exists, and associated with variable length chain document character string identifying information for identifying a partial document character string of a length of M characters (M being a predetermined integer of one or more) and a variable length chain document character string in which said partial document character string exists from said variable length chain document character string;

(b) means for identifying a variable length chain document character string relating to the partial document character string matching said partial search character string from the variable length chain document character string identifying information for the partial document character string matching said partial search character string; and (c) means for identifying a document character string in which said identified variable length chain document character string exists from document character string identifying information for said identified variable length chain document character string.

13. An apparatus for searching a document character string which contains a variable length chain document character string, and which is similar to a search character string at a predetermined similarity factor or higher, said search character string containing a variable length chain search character string, in a document searchably stored through computer processing, the apparatus comprising:

(a) means for associating document character string identifying information for identifying a document character string in which said variable length chain document character string exists and document character string position information indicating the position in the document character string at which said variable length chain document character string exists with said variable length chain document character string;

(b) means for extracting and storing a partial document character string of a length of M characters (M being a predetermined integer of one or more) from said variable length chain document character string;

(c) means for associating variable length chain document character string identifying information for identifying a variable length chain document character string in which said partial document character string exists and variable length chain document character string position information for indicating the position in the variable length chain document character string at which said partial document character string exists with said partial document character string;

(d) means for searching a partial document character string matching a partial search character string of a length of N characters (N being a predetermined integer of one or more) extracted from said variable length chain search character string;

(e) means for searching a partial document character string matching a partial search character string of a length of N characters in said variable length chain search character string but having a start position shifted by one;

(f) means for identifying a set of partial document character strings matching the partial search character string in said variable length chain search character string by repeating the step (e);

(g) means for identifying a variable length chain document character string similar to said variable length chain search character string from variable length chain document character string identifying information and variable length chain document character string position information for a partial character string belonging to said set of partial document character strings; and (h) means for identifying a document character string in which said identified variable length chain document character string exists from the document character string identifying information for said identified variable length chain document character string.

14. An apparatus, including a storage device, for creating a file for search by a computer from a document containing a plurality of variable length chains in a storage device accessible by a computer, the apparatus comprising:

(a) means for extracting a first variable length chain from said document;

(b) means for storing position information for the position in said document at which said first variable length chain appears;

(c) means for extracting a first extended fixed length chain from said first variable length chain; and (d) means for storing information for identifying said first variable length chain in which said first extended fixed length chain exists and position information for the position in the first variable length chain at which said first extended fixed length chain exists.

15. An apparatus for creating a file for search by a computer from a document containing a plurality of variable length chains in a storage device accessible by a computer, the apparatus comprising:

(a) means for extracting said plurality of variable length chains from said document and storing them in a character chain file;

(b) means for storing position information for the positions in said document at which said plurality of variable length chains appear in a position information file;

(c) means for extracting an extended fixed length chain of a length of M characters (M being a predetermined integer of one or more) from each of said plurality of variable length chains, and storing it in an extended character chain file;

(d) means for storing information for identifying said variable length chain in which said extended fixed length chain exists and position information for the position in the variable length chain at which said extended fixed length chain exists in an extended position information file.

16. An apparatus for calculating with a computer a similarity factor between a first character string containing a first variable length chain and a second character string containing a second variable length chain, the apparatus comprising:

(a) means for searching a partial character string from the first variable length chain character string, the partial character string matching said second variable length chain for a partial character string of a length of N characters (N being a predetermined integer of one or more);

(b) means for searching a partial character string matching said second variable length chain for a partial character string of a length of N characters the start position of which is that of a partial character string in said first variable length chain shifted by one;

(c) means for deriving variable length chain matching character identifying information for identifying characters matching said first variable length chain in said second variable length chain by repeating said means for searching a partial character string matching said second variable length chain;

(d) means for calculating a variable length chain matching factor between said first and said second variable length chains based on said variable length chain matched character identifying information and the number of characters in said first variable length chain; and (e) means for calculating a similarity factor of said first character string based on said variable length chain matching factor.

17. An apparatus for calculating with a computer a similarity factor between a first character string containing a first variable length chain and a second character string containing a second variable length chain, the apparatus comprising (a) a storage device for storing:

(a1) a character chain file managing the content of said second variable length chain character string;

(a2) a position information file managing character string identifying information identifying the second character string in which said second variable length chain character string exists, and character string position information indicating the position in the second character string at which said second variable length chain character string exists;

(a3) an extended character chain file managing a first partial character string of a length of M characters (M being a predetermined integer of one or more) extracted from said second variable length chain character string; and (a4) variable length chain character string identifying information identifying a second variable length chain character string in which the first partial character string exists, and an extended position information file managing variable length chain character string position information indicating the position in the second variable length chain character string at which the first partial character string exists;

(b) means for searching a second partial character string matching a first partial character string of a length of N characters (N being a predetermined integer of one or more) extracted from said first variable length chain character string;

(c) means for searching a second partial character string matching a first partial search character string of a length of N characters which is a first partial character string in said first variable length chain character string but having a start position shifted by one;

(d) means for identifying a set of second partial character strings matching the first partial character string in said first variable length chain character string by repeating said means (c);

(e) means for identifying candidates of variable length chain character strings which have possibility of matching said first variable length chain character string at the predetermined matching factor or higher variable length chain from variable length chain character string identifying information and variable length chain character string position information for a second partial character string belonging to said set of second partial character strings;

(f) means for calculating a variable length chain matching factor between said first variable length chain character string and said variable length chain character string candidates;

(g) means for a selecting a second variable length chain character string with a matching factor of variable length chain equal to or higher than a predetermined matching factor of variable length chain with the first variable length chain character string from the variable length chain character string candidates;

(h) means for identifying the second document character string in which said selected second variable length chain character string exists from the character string identifying information for said selected second variable length chain character string; and (i) means for calculating a character string similarity factor between the second character string in which said selected second variable length chain character string exists and the search character string containing said first variable length chain search character string based on said variable length chain matching factor.

18. An apparatus for locating a position where there exists a document character string in a document containing a variable length chain character string and searchably stored through computer processing, the document character string being similar to a search character string containing a variable length chain character string with a predetermined similarly factor or higher, the apparatus comprising:

(a) means for locating the start and end positions of match in said variable length chain document character string for a partial character string of a length of M characters (M being a predetermined integer of one or more) from the top of said variable length chain search character string (hereinafter the partial character string of a length of M characters determined by the start and end positions being referred to a "valid matched character string");

(b) means for locating the (i+i)-th valid matched character string satisfying the following conditions:

$$e(D, i)+1 \leq s(D, i+1) \leq e(D, i)+L+1,$$

and $$s(C, i+1) > e(C, i) - (M-1)$$

where
s(D, i) is the start position of the i-th valid matched character string in the document;
e(D, i) is the end position of the i-th valid matched character string in the document;
s(C, i) is the start position of the i-th valid matched character string in a character string to be searched;
e(C, i) is the end position of the i-th valid matched character string in a character string to be searched; and
L is a predetermined integer of one or more;

(c) means for continuing the step (b) as long as said valid matched character strings can be located;

(d) means for calculating a similarity factor between said variable length chain search character string and a character string which exists between the start position of the first valid matched character string in said variable length chain document character string and the end position of the last valid matched character string in said variable length chain document character string based on information on existence of valid matched character strings in a character string at least between the start position of the first valid matched character string in said variable length chain document character string and the end position of the last valid matched character string in said variable length chain document character string;

(e) means for identifying said variable length document character string in response to the fact that said calculated similarity factor is equal to or higher than a predetermined similarity factor; and (f) means for identifying a document character string containing said identified variable length chain document character string.

19. A medium readable by a computer for storing a program which searches a document character string which contains a variable length chain document character string, and which is similar to a search character string, said search character string containing a variable length chain search character string, in a document searchably stored through computer processing, the program comprising:

(a) program code means for directing the computer to associate said variable length chain document character string with document character string identifying information for identifying a document character string in which said variable length chain document character string exists;

(b) program code means for directing the computer to associate a partial document character string of a length of M characters (M being a predetermined integer of one or more) from said variable length chain document character string with variable length chain document character string identifying information for identifying a variable length chain document character string in which said partial document character string exists;

(c) program code means for directing the computer to search a partial document character string matching a partial search character string of a length of N characters (N being a predetermined integer of one or more) extracted from said variable length chain search character string;

(d) program code means for directing the computer to identify a variable length chain document character string relating to the partial document character string matching said partial search character string from the variable length chain document character string identifying information for the partial document character string matching said partial search character string; and (e) program code means for directing the computer to identify a document character string in which said identified variable length chain document character string exists from document character string identifying information for said identified variable length chain document character string.

20. A medium readable by a computer for storing a program which searches a document character string which contains a variable length chain document character string, and which is similar to a search character string, said search character string containing a variable length chain search character string, in a document searchably stored through computer processing, the program comprising:

(a) program code means for directing the computer to search a partial document character string matching a partial search character string of a length of N characters (N being a predetermined integer of one or more) extracted from said variable length chain search character string in an index file, in which index file said variable length chain document character string is associated with document character string identifying information for identifying a document character string in which said variable length chain document character string exists, and a partial document character string of a length of M characters (M being a predetermined integer of one or more) from said variable length chain document character string is associated with variable length chain document character string identifying information for identifying a variable length chain document character string in which said partial document character string exists;

(b) program code means for directing the computer to identify a variable length chain document character string relating to the partial document character string matching said partial search character string from the variable length chain document character string identifying information for the partial document character string matching said partial search character string; and (c) program code means for directing the computer to identify a document character string in which said identified variable length chain document character string exists from document character string identifying information for said identified variable length chain document character string.

21. A medium readable by a computer, including a storage device, for storing a program which creates a file for computer search from a document containing a plurality of variable length chains in a storage device accessible by a computer, the program comprising:

(a) program code means for directing the computer to extract a first variable length chain from the document;

(b) program code means for directing the computer to store position information for the position in said document at which said first variable length chain appears;

(c) program code means for directing the computer to extract a first extended fixed length chain from said first variable length chain; and (d) program code means for directing the computer to store information for identifying said first variable length chain in which said first extended fixed length chain exists and position information for the position in said first variable length chain at which said first extended fixed length chain exists.

22. A medium readable by a computer for storing a file for computer search, the medium comprising:

(a) a character chain file for storing a plurality of variable length chains extracted from a document containing said plurality of variable length chains;

(b) a position information file for managing position information for the position in the document at which said plurality of variable length chains appear;

(c) an extended character chain file for storing an extended fixed length chain of a length of M characters (M being a predetermined integer of one or more) extracted from each of the plurality of variable length chains; and (d) an extended position information file for storing information for identifying said variable length chain in which said extended fixed length chain exists, and position information for the position in the variable length chain at which said extended fixed length chain exists.

* * * * *